US007657105B2

(12) United States Patent
Ström

(10) Patent No.: US 7,657,105 B2
(45) Date of Patent: Feb. 2, 2010

(54) ALPHA IMAGE PROCESSING

(75) Inventor: Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 546 days.

(21) Appl. No.: 10/582,689

(22) PCT Filed: Dec. 17, 2004

(86) PCT No.: PCT/SE2004/001920

§ 371 (c)(1),
(2), (4) Date: Jun. 13, 2006

(87) PCT Pub. No.: WO2005/059837

PCT Pub. Date: Jun. 30, 2005

(65) Prior Publication Data
US 2007/0127812 A1    Jun. 7, 2007

(30) Foreign Application Priority Data
Dec. 19, 2003  (SE) .................................... 0303497
Jul. 8, 2004   (SE) .................................... 0401850

(51) Int. Cl.
*G06K 9/36* (2006.01)
(52) U.S. Cl. .................................... 382/232
(58) Field of Classification Search .................. 382/162, 382/164–167, 232, 243; 375/240.25
See application file for complete search history.

(56) References Cited
U.S. PATENT DOCUMENTS

| | | | |
|---|---|---|---|
| 5,444,800 A | | 8/1995 | Kim |
| 5,748,904 A | | 5/1998 | Huang et al. |
| 5,793,371 A | * | 8/1998 | Deering .................... 345/418 |
| 5,835,244 A | * | 11/1998 | Bestmann .................. 358/523 |
| 5,926,647 A | | 7/1999 | Adams et al. |
| 5,956,431 A | | 9/1999 | Iourcha et al. |

(Continued)

FOREIGN PATENT DOCUMENTS

CN    1307782 A    8/2001

(Continued)

OTHER PUBLICATIONS

International Search Report for PCT/SE2004/001920 dated Apr. 6, 2005.

(Continued)

*Primary Examiner*—Jose L Couso
(74) *Attorney, Agent, or Firm*—Nixon & Vanderhye, P.C.

(57) ABSTRACT

An alpha image encoding and decoding scheme is disclosed. In the encoding an alpha image, is decomposed into image blocks (600) comprising multiple image element (610). The blocks (600) are compressed into block representations (700). A block representation (700) comprises at least a color codeword (710), an alpha codeword (720), an alpha modifying codeword (730) and a sequence (740) of alpha modifier indices. The color (710) and alpha (720) codeword (710) are representations of the colors and alpha value of the image elements (610) of the block (600), respectively. The alpha modifying codeword (730) is a representation of a set of multiple alpha modifiers for modifying an alpha value represented by the alpha codeword (720). The index sequence (740) includes an alpha index for each image element (610) in the block (600), where an alpha index identifies one of alpha modifiers in the alpha modifier set.

27 Claims, 15 Drawing Sheets

U.S. PATENT DOCUMENTS

| | | | |
|---|---|---|---|
| 6,023,266 | A | 2/2000 | Eglit et al. |
| 6,297,826 | B1 | 10/2001 | Semba et al. |
| 6,404,923 | B1 | 6/2002 | Chaddha |
| 6,636,222 | B1 * | 10/2003 | Valmiki et al. ............ 345/505 |
| 6,658,146 | B1 | 12/2003 | Iourcha et al. |
| 7,251,360 | B2 * | 7/2007 | Takahashi ................ 382/167 |
| 2003/0053706 | A1 | 3/2003 | Hong et al. |
| 2003/0090709 | A1 | 5/2003 | Rijavec |
| 2007/0019869 | A1 | 1/2007 | Ström et al. |
| 2007/0071333 | A1 | 3/2007 | Ström et al. |
| 2007/0140554 | A1 | 6/2007 | Ström et al. |
| 2007/0237404 | A1 | 10/2007 | Ström |

FOREIGN PATENT DOCUMENTS

| | | |
|---|---|---|
| EP | 0 739 139 | 10/1996 |
| WO | WO 2005/059836 | 6/2005 |
| WO | 2006/006915 | 1/2006 |
| WO | 2007/021227 | 2/2007 |

OTHER PUBLICATIONS

Delp et al., "Image Compression Using Block Truncation Coding" IEEE Transactions on Communications, vol. COM-27, No. 9, pp. 1335-1342, Sep. 1979.

Campbell et al., Two Bit/Pixel Full Encoding, Siggraph '86, vol. 20, No. 4, pp. 215-223, Aug. 1986.

Fenny, "Texture Compression using Low-Frequency Signal Modulation", Graphics Hardware 2003, pp. 84-91, Jul. 2003.

Akenine-Möller et al., "Graphics for the Masses: A Hardware Rasterization Architecture for Mobile Phone", ACM Transactions on Graphics, vol. 22, No. 3, Proceedings of ACM SIGGRAPH 2003, pp. 801-808, Jul. 2003.

Chinese Office Action mailed Mar. 7, 2008 in CN application 200480038094.6.

Y. Linde et al, "An algorithm for vector quantizer design", *IEEE Transactions on Communications*, vol. 28, pp. 84-94, Jan. 1980.

U.S. Office Action mailed Mar. 9, 2009 in related U.S. Appl. No. 10/582,988.

U.S. Office Action mailed Mar. 3, 2009 in related U.S. Appl. No. 10/583,453.

U.S. Office Action mailed Mar. 16, 2009 in related U.S. Appl. No. 10/583,454.

U.S. Office Action mailed May 15, 2009 in related U.S. Appl. No. 11/401,444.

Said et al, "A new, Fast, and Efficient Image Codec Based on Set Partitioning in Hierarchical Trees", IEEE Transactions on Circuits and Systems for Video Technology, vol. 6, No. 3, Jun. 1996, pp. 243-250.

Pettersson et al., "Texture Compression: THUMB—Two Hues Using Modified Brightness", XP-002396817, pp. 7-12, 2005.

Ström et al., "iPackman: High-quality, Low-Complexity Texture Compression for Mobile Phones", XP-002396818, Graphics Hardware, Jul. 30-31, 2005, pp. 64-70.

European Standard Search Report completed Aug. 30, 2006.

\* cited by examiner

| COLOR CODEWORD | α | α–MOD. WORD | α MODIFIER INDICES |
|---|---|---|---|
| 710 | 720 | 730 | 740 |

Fig. 3A

| COLOR CODEWORD | COLOR MOD. WORD | α | α–MOD. WORD | COLOR MODIFIER INDICES | α MODIFIER INDICES |
|---|---|---|---|---|---|
| 710 | 750 | 720 | 730 | 760 | 740 |

Fig. 3B

| 1ST COLOR SUBCODEWORD | 2ND COLOR SUBCODEWORD | α | α–MOD. WORD | COLOR INDICES | α MODIFIER INDICES |
|---|---|---|---|---|---|
| 710A | 710B | 720 | 730 | 770 | 740 |

Fig. 3C

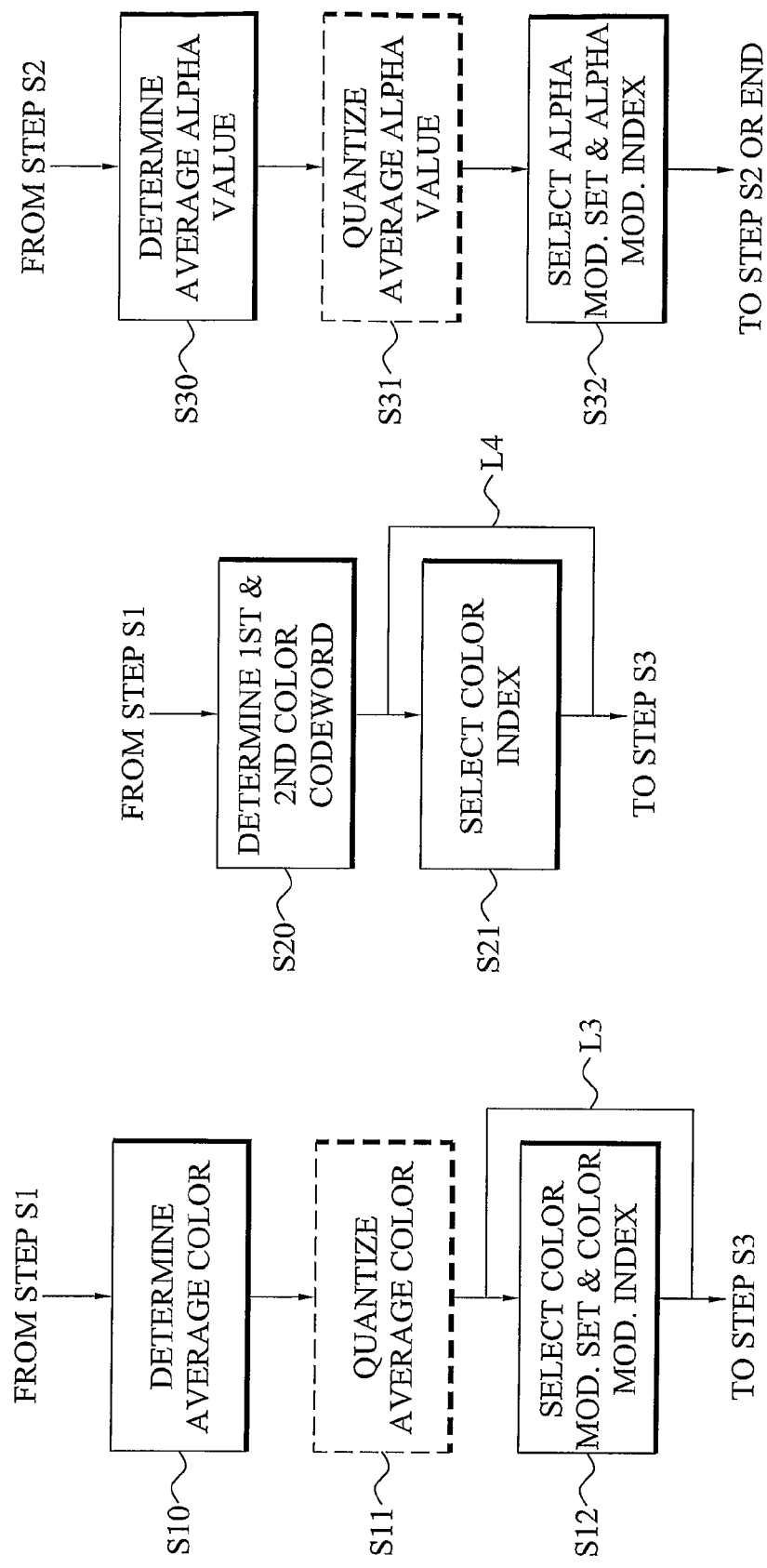

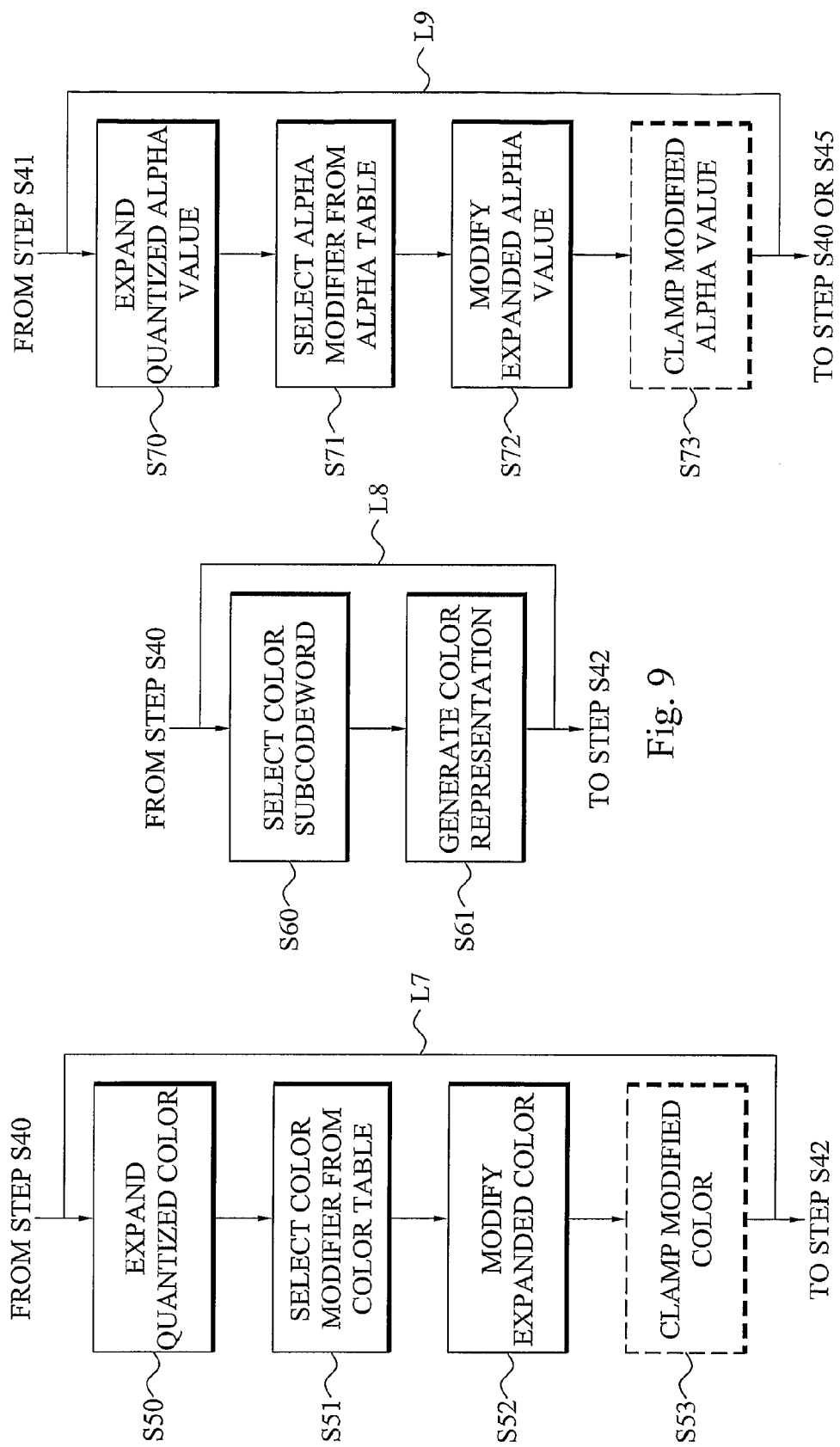

ALPHA IMAGE PROCESSING

This application is the US national phase of international application PCT/SE2004/001920 filed 17 Dec. 2004, which designated the U.S. and claims priority to SE 0303497-2 filed 19 Dec. 2003, and SE 0401850-3 filed 8 Jul. 2004, the entire contents of each of which are hereby incorporated by reference.

TECHNICAL FIELD

The technology disclosed herein generally refers to image processing, and in particular to methods and systems for encoding and decoding images.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage typically also performs sorting using a z-buffer.

However, rendering of images and textures, and in particular 3D images and graphics, is a computationally expensive task in terms of memory bandwidth and processing power required for the graphic systems. For example, textures are costly both in terms of memory, the textures must be placed on or cached in fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering.

In addition to efficiently and accurately compressing and decompressing an image, there is a general desire that the texture compression and decompression systems should have the capability of managing alpha components. Such alpha components can be used to represent transparent or semi-transparent pixels or texels in the textures, which are used in a wide range of applications.

In a patent description U.S. Pat. No. 5,956,431, Iourcha et al. disclose a texture compression scheme called S3TC (S3 Texture Compression) or DXTC (DirectX Texture Compression). An image is decomposed into a number of image blocks of 4 pixels×4 pixels. Each such image block is encoded into a bit sequence of 64 bits, thus resulting in a compression rate of 4 bpp (bits per pixel). The 64-bit sequence comprises two basic colors or color codewords and a sequence of pixel indices, one index for each pixel in the image block. During decoding, a color palette of four colors is generated. The first two RGB (red, green and blue) colors of the palette correspond to the two basic colors (codewords). The two additional colors, situated between the basic colors in the RGB space, are then interpolated therefrom. Each pixel index then identifies, for each pixel, one of the four colors of the palette to use for that pixel.

During the interpolation of the two additional colors of the color palette, multiplication by $1/3$ and $2/3$ is performed, which is not ideal in hardware.

In addition, the compression using S3TC is relatively time consuming.

The S3TC scheme handles alpha textures as a special case. The bits are then interpreted differently in order to allow for a so-called punch-through alpha. This simple version of alpha mechanism represents each pixel as either being completely opaque or transparent. The fact that S3TC cannot handle more accurate alpha is one of the major drawbacks of the system.

SUMMARY

The technology disclosed herein overcomes these and other drawbacks of the prior art arrangements.

It is a general object of the technology disclosed herein to provide an efficient image processing.

It is another object of the technology disclosed herein to provide an efficient image encoding and image decoding.

A further object of the technology disclosed herein is to provide image encoding and decoding adapted for alpha images comprising transparent and/or semi-transparent image elements.

Briefly, the technology disclosed herein involves alpha image processing in the form of encoding (compressing) an alpha image and decoding (decompressing) an encoded (compressed) image.

According to the technology disclosed herein, an alpha image to be encoded is decomposed into a number of image blocks comprising multiple image elements (pixels, texture elements, texels, or volume elements, voxels). An image block preferably comprises eight image elements and preferably has a size of $2^m$ times $2^n$ image elements, where m=3−n and n=0, 1, 2, 3, or a size of $2^m \times 2^n \times 2^p$, where m, n, p=0, 1, 2, 3 and preferably m+n+p=3. Each image element in a block is characterized by a color and an alpha or transparency value. The individual image blocks are then compressed.

In this lossy block encoding, a color codeword is determined for the image block. The color codeword is a representation of the colors of the image elements of the image block. Furthermore, an alpha codeword is determined for the image block. This alpha codeword is a representation of the alpha values of the image elements in the block. A preferred representation is a quantized average alpha value of the image elements in block.

Thereafter, an alpha modifying codeword is provided for the image block. This alpha modifying codeword is a representation of a set of multiple alpha modifiers that are used (during decoding) for modifying or modulating the alpha value represented by the alpha codeword. Once the alpha modifying codeword is provided, alpha modifier indices are selected for the image elements in the image block. Each such modifier index is associated with an alpha modifier from the alpha modifier set.

In a preferred embodiment of the technology disclosed herein, an image block can be compressed according one of multiple, preferably two, possible compression modes. The use of two different compression modes provides flexibility to the encoding method by being able to better adapt to the properties of the individual image blocks in the alpha image. As a consequence of having a choice, per block basis, between two different compression modes, the image quality of the processed image is improved compared to the prior art alpha-adapted encoding schemes with a single-mode encoding.

In the first compression mode, a color modifying codeword is generated. This color modifying codeword is a representation of a set of multiple intensity or color modifiers that are used (during decoding) for modifying or modulating the colors of the image elements in the block. Once the color modifying codeword is provided, color modifier indices are selected for the image elements in the image block. Each such modifier index is associated with an alpha modifier from the alpha modifier set.

In the second compression mode, the color codeword comprises a first color subcodeword and a second color subcodeword. The first color subcodeword preferably represents the colors of the image elements in a first portion of the image block, whereas the second subcodeword represents the colors of the image elements in a second portion of the block. Furthermore, color indices associated with the first or second color subcodeword are preferably generated for a first subset of the image elements in the block. A remaining second subset of the image elements in the block preferably has a pre-defined association with one of the color subcodewords so that no color index is required for the image element(s) of this remaining subset.

Although image block representations compressed according to the two modes include different codewords and image element associated indices, the sizes of the compressed block representations in terms of the number of bits are preferably equal for both modes.

The selection of compression mode to use for an image block can be performed before determining the codewords and index sequence, preferably based on an investigation of the properties of the image elements in the block, e.g. based on the distribution of the color values of the image elements in the color space. Alternatively, the mode selection is made during or after generation of the codewords and index sequence. In the latter case, two compressed representations of the image block will be produced, one according to the first compression mode and one according to the second mode. A first error value associated with compressing the image block according to the first mode is determined using the block representation compressed according to this first mode. Correspondingly, also a second error value associate with compressing the image block according to the second mode is determined using the block representation compressed according to the second mode. These two error values are then compared, and the compression mode resulting in highest quality (smallest error value) is selected. The block representation compressed according to this selected mode will be used as encoded representation for the current block.

During decoding, the compressed image block(s) that should be decompressed is identified and fetched from e.g. a memory location. Once the correct compressed image block is identified, a decoded representation of at least one image element in the identified compressed image block is generated using the codewords and indices.

The technology disclosed herein offers the following advantages:
- Gives high quality (peak signal/noise ratio) for alpha images due to the flexibility of allowing alpha values representing, in addition to fully transparency and opacity, semi-transparency;
- Hardware implementation of decoding is extremely simple;
- Encoding is very fast, which enables implementations also in terminals with low clock frequencies;
- Can be extended to operate according to two modes adapted for different image blocks, which will further improve the peak signal/noise ratio; and
- Exhaustive encoding is possible at feasible speed on a computer.

Other advantages offered by the technology disclosed herein will be appreciated upon reading of the below description of the example embodiments.

SHORT DESCRIPTION OF THE DRAWINGS

The invention together with further objects and advantages thereof, may best be understood by making reference to the following description taken together with the accompanying drawings, in which:

FIGS. 3A to 3C illustrate embodiments of compressed representations of an image block;

FIG. 4 is a flow diagram illustrating an embodiment of the color codeword determining step of the image encoding method of FIG. 1;

FIG. 5 is a flow diagram illustrating another embodiment of the color codeword determining step of the image encoding method of FIG. 1;

FIG. 6 is flow diagram illustrating the steps of determining alpha codeword, determining alpha modifying codeword and selecting alpha modifier index of FIG. 1 in more detail;

FIG. 8 is a flow diagram illustrating an embodiment of the color representation generating step of FIG. 7 in more detail;

FIG. 9 is a flow diagram illustrating another embodiment of the color representation generating step of FIG. 7 in more detail;

FIG. 10 is a flow diagram illustrating the steps of generating alpha representation, selecting alpha modifier and modifying alpha representation of FIG. 7 in more detail;

Figure 11:
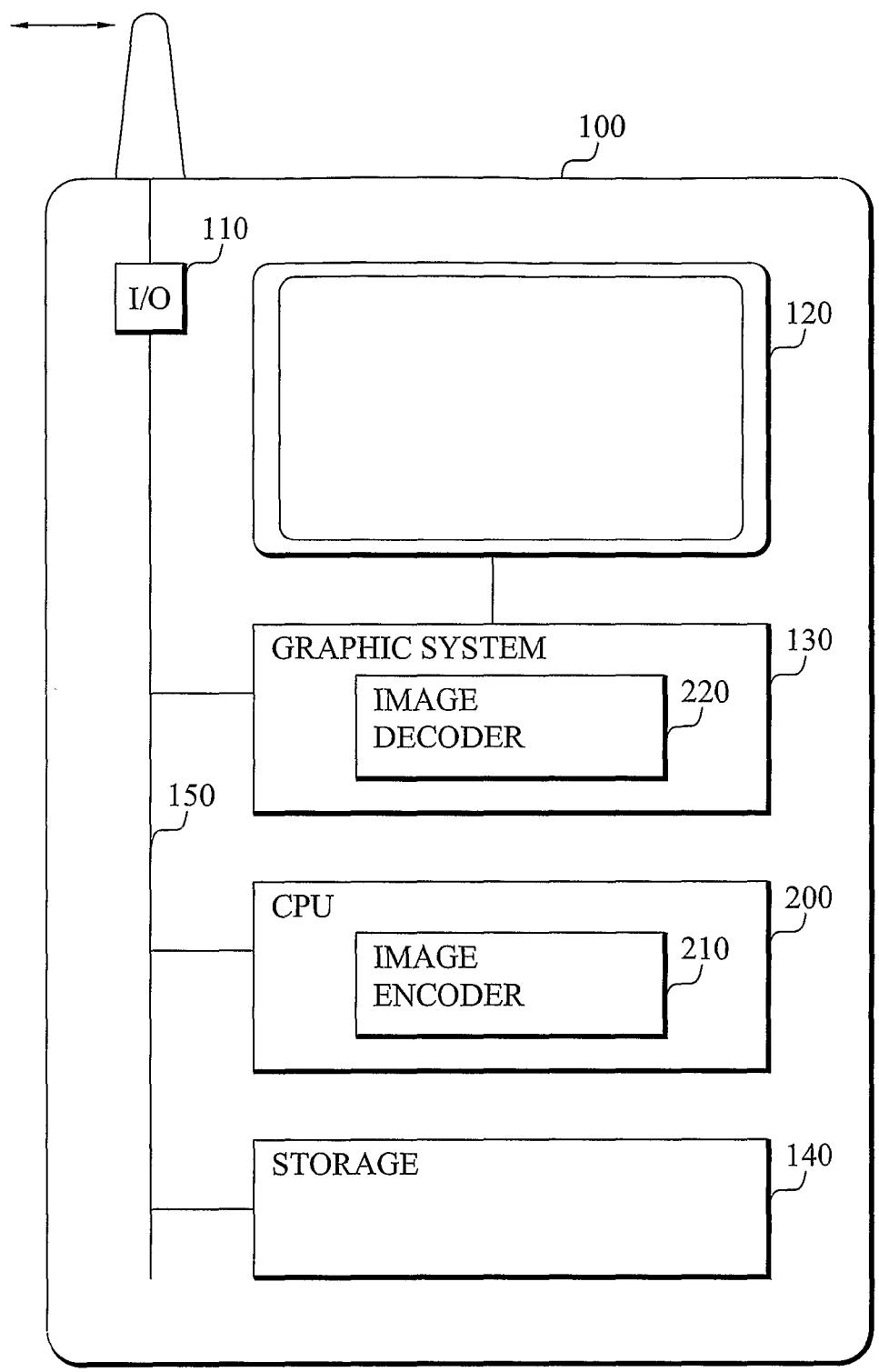
Figure 13:
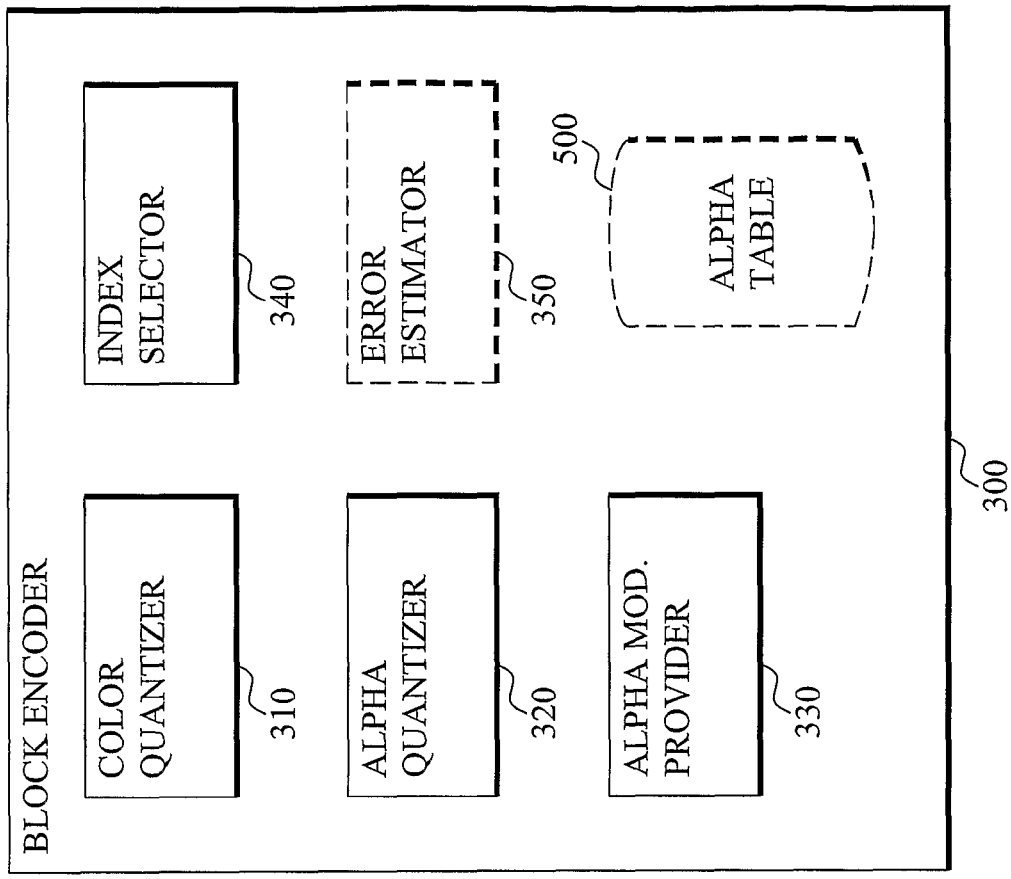
Figure 12:
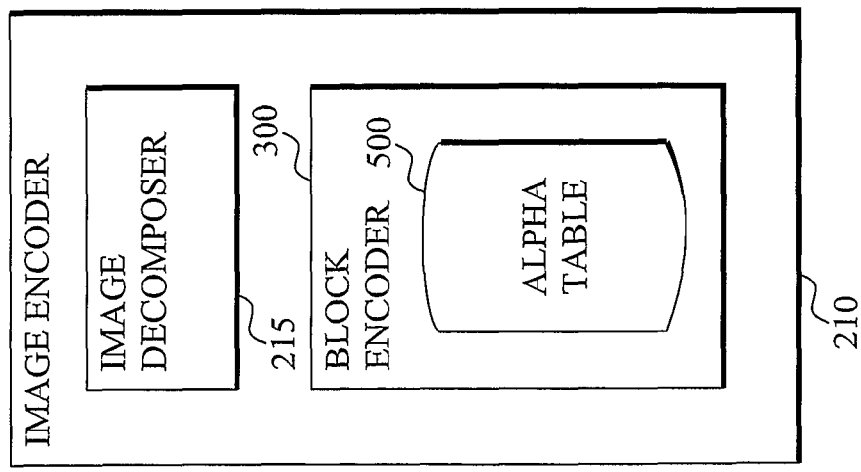
Figure 14:
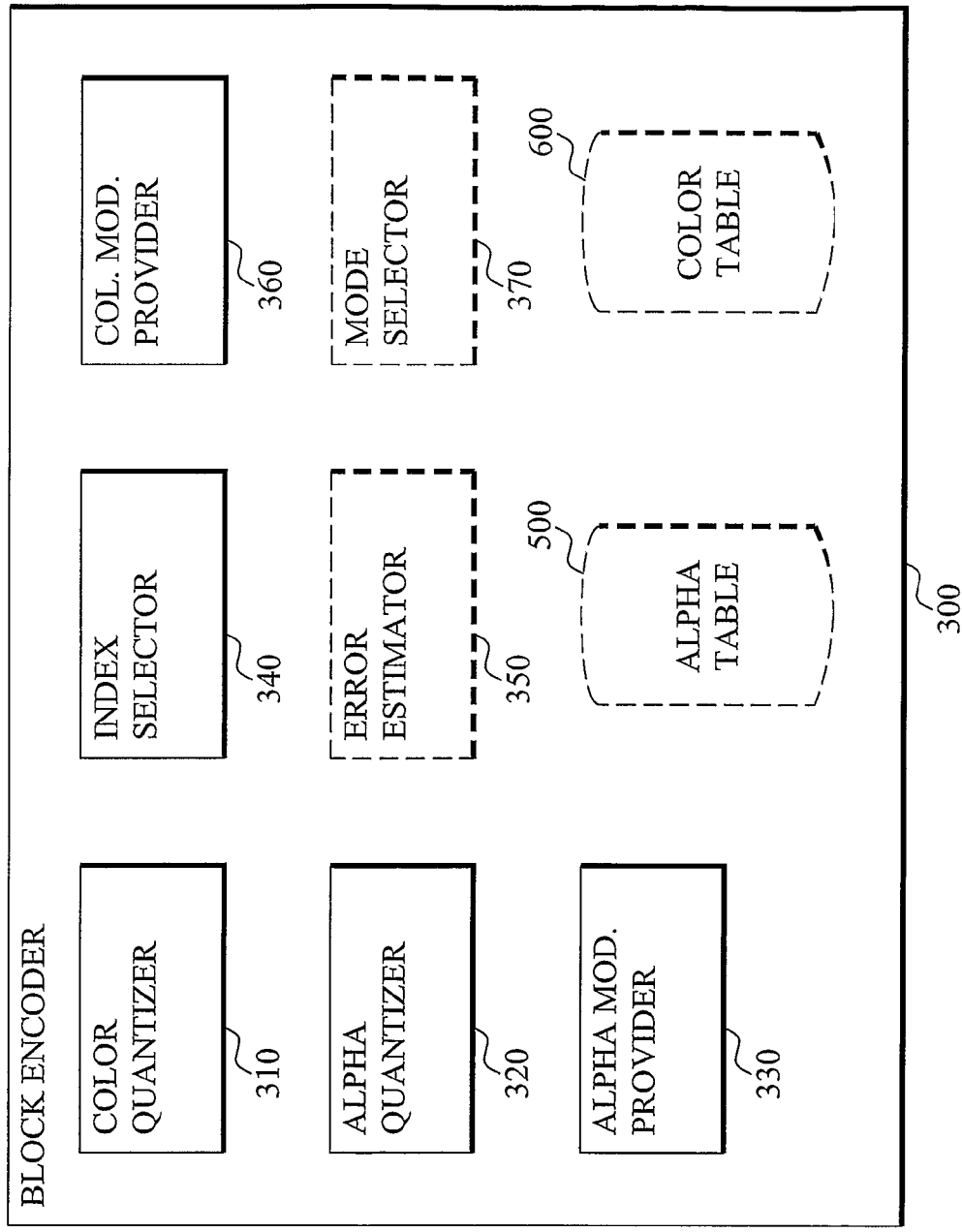
Figure 17:
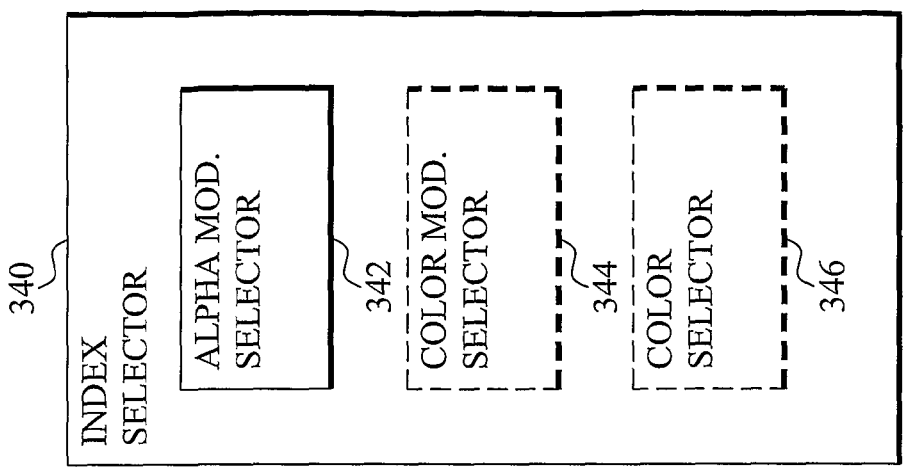
Figure 16:
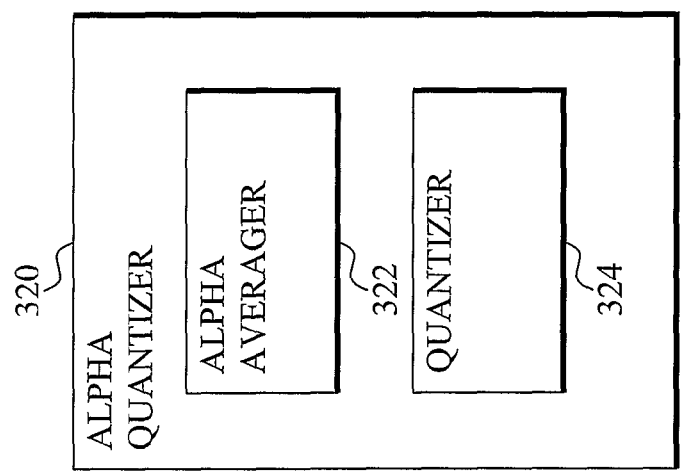
Figure 15:
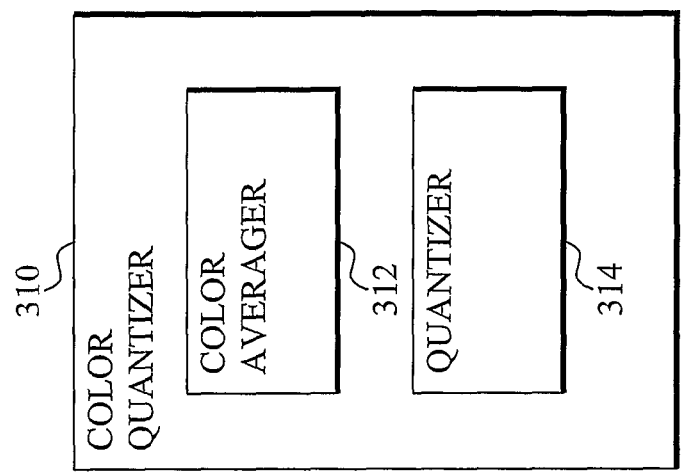
Figure 19:
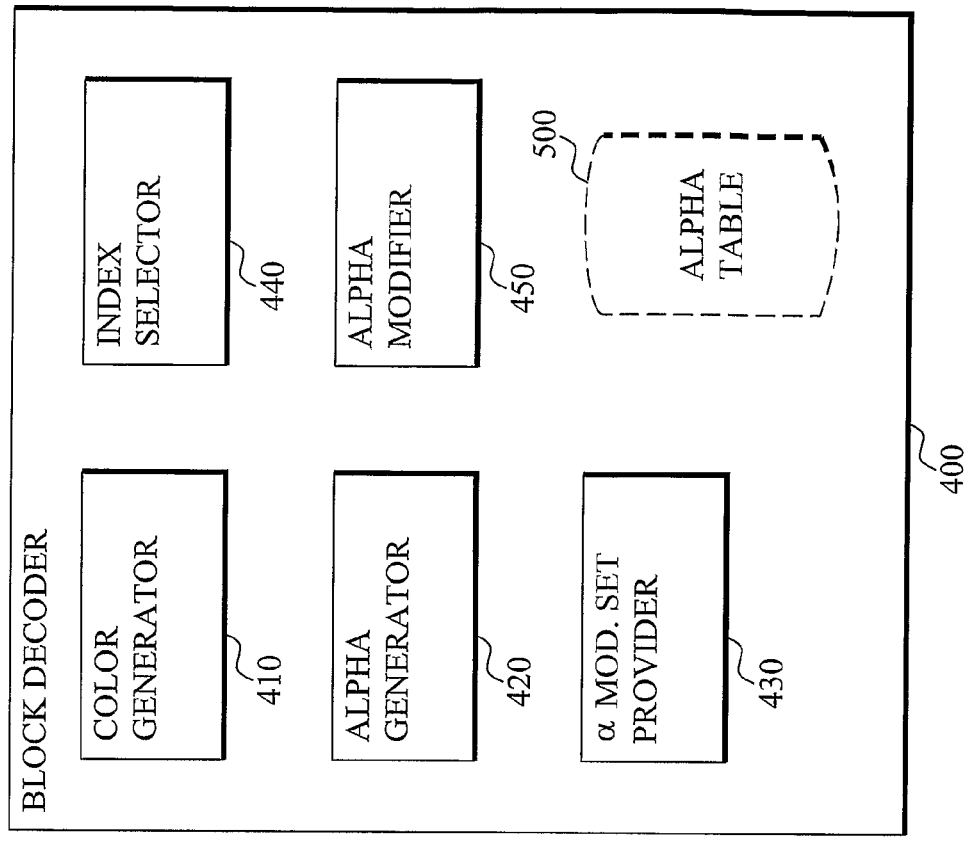
Figure 18:
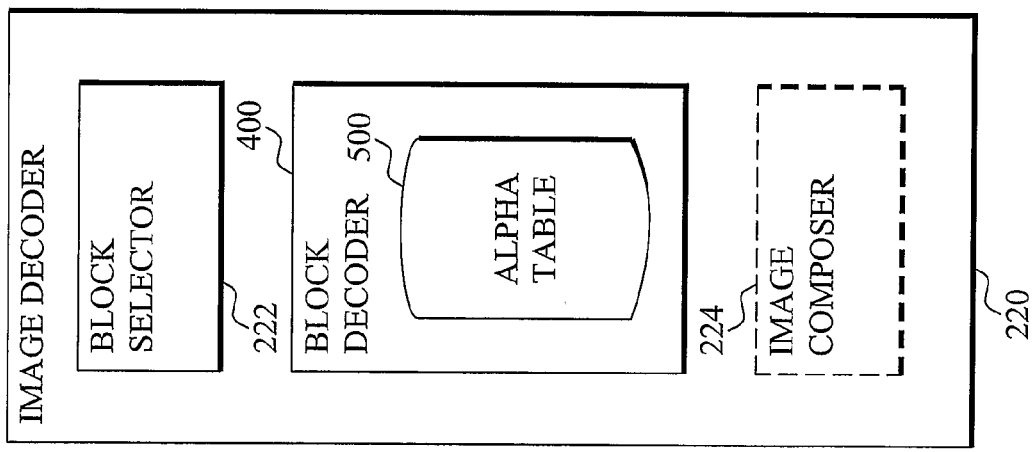
Figure 20:
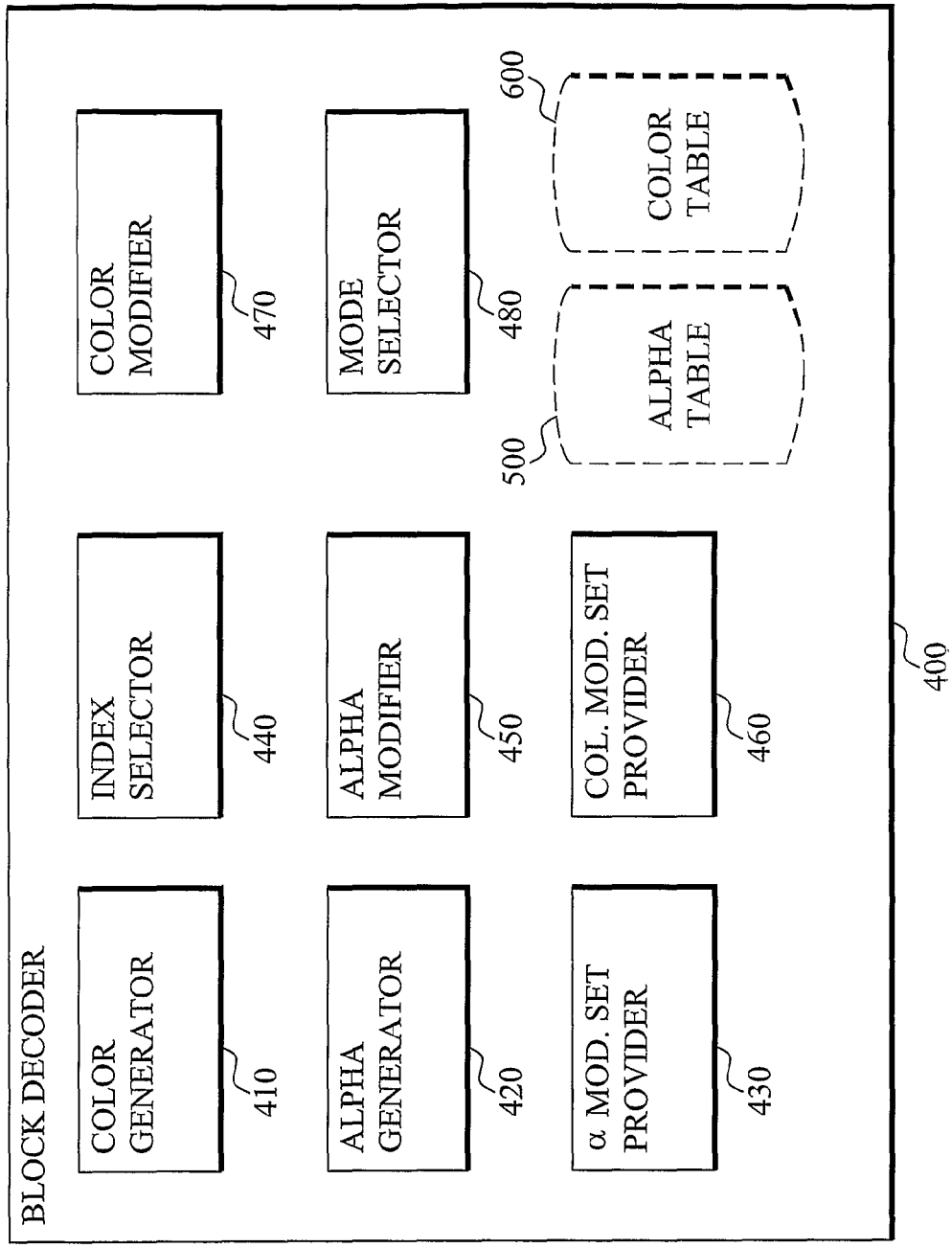
Figure 21:
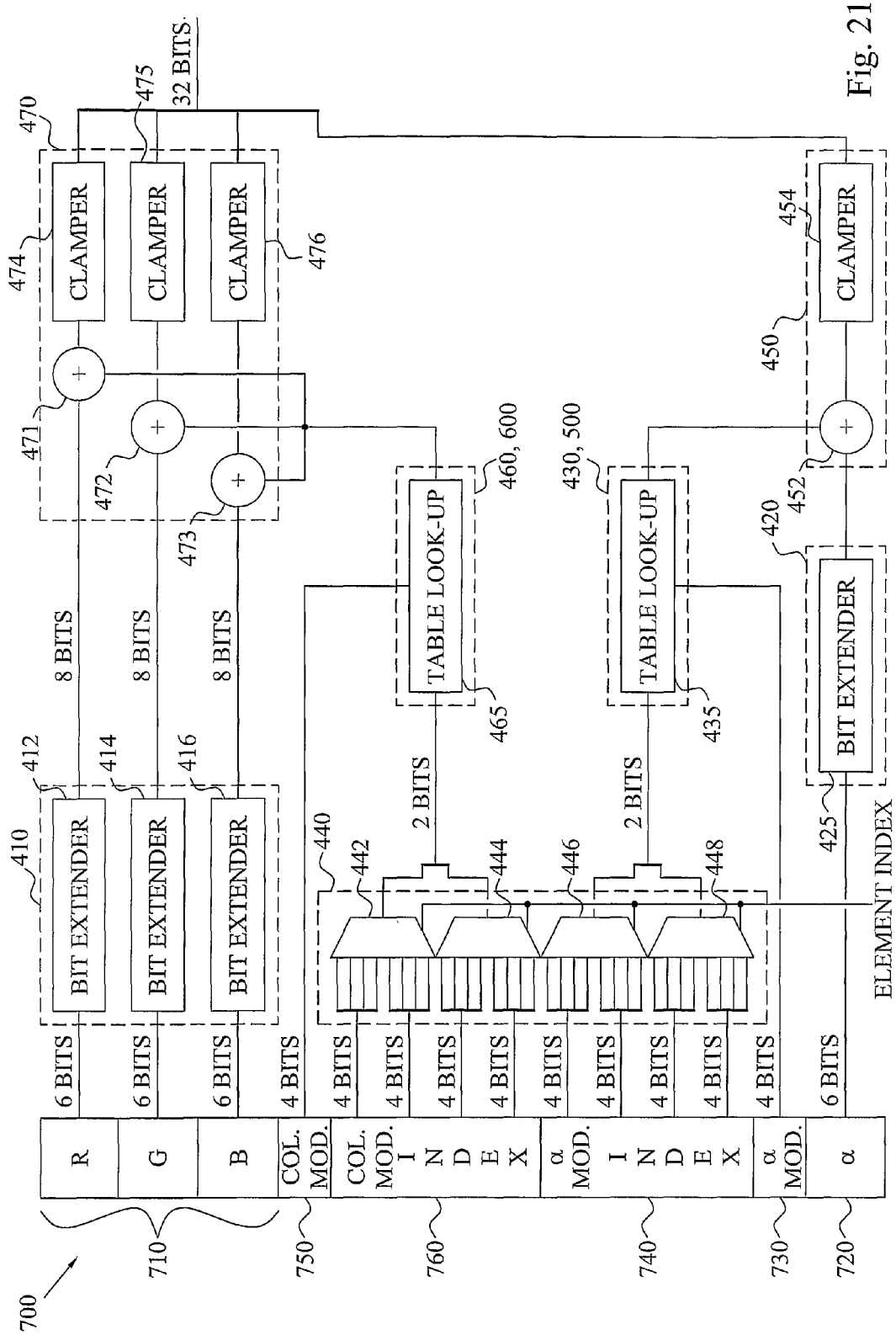
Figure 22:
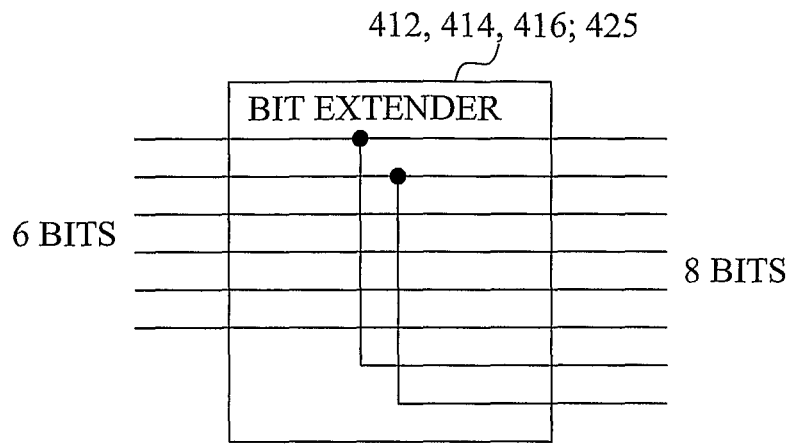
Figure 23:
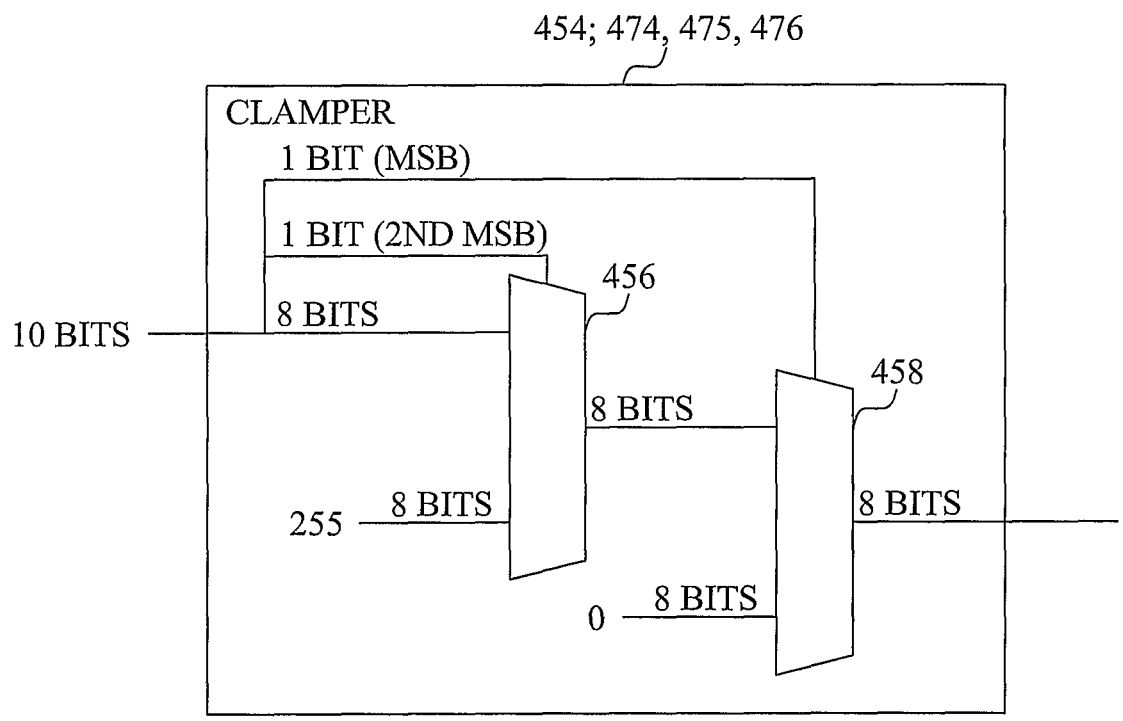
Figure 24:
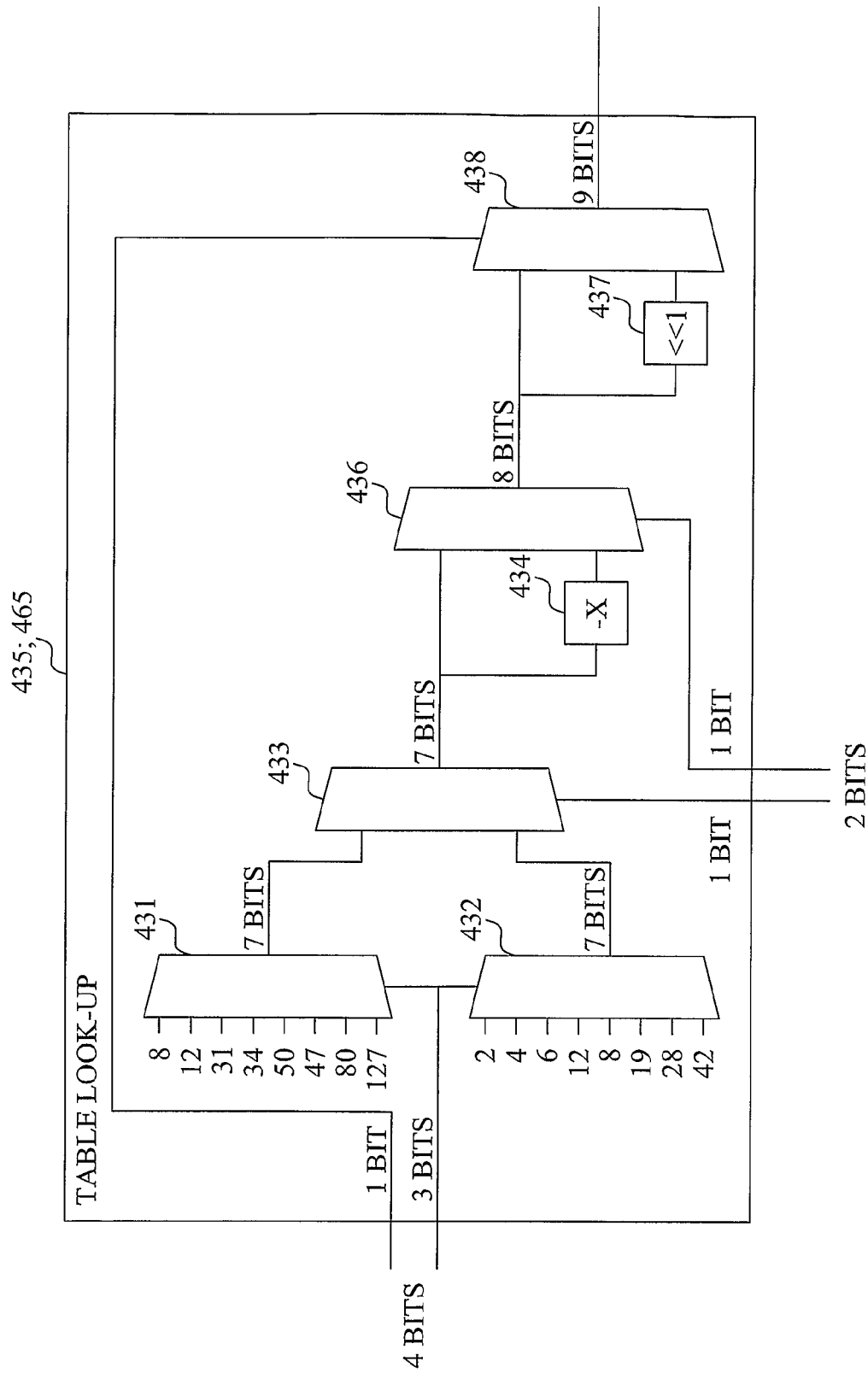

FIG. 11 schematically illustrates an example of a user terminal with an image encoder and decoder according to the present invention;

FIG. 12 is a block diagram schematically illustrating an example embodiment of an image encoder;

FIG. 13 is a block diagram schematically illustrating an example embodiment of a block encoder;

FIG. 14 is a block diagram schematically illustrating another example embodiment of a block encoder;

FIG. 15 is a block diagram schematically illustrating the color quantizer of the block encoder of FIG. 14 or 15 in more detail;

FIG. 16 is a block diagram schematically illustrating the alpha quantizer of the block encoder of FIG. 14 or 15 in more detail;

FIG. 17 is a block diagram schematically illustrating the index selector of the block encoder of FIG. 14 or 15 in more detail;

FIG. 18 is a block diagram schematically illustrating an example embodiment of an image decoder;

FIG. 19 is a block diagram schematically illustrating an example embodiment of a block decoder;

FIG. 20 is a block diagram schematically illustrating another example embodiment of a block decoder;

FIG. 21 is a hardware block diagram schematically illustrating an example embodiment of a block decoder;

FIG. 22 is hardware block diagram illustrating an embodiment of the bit extenders of FIG. 21 in more detail;

FIG. 23 is hardware block diagram illustrating an embodiment of the clampers of FIG. 21 in more detail; and FIG. 24 is hardware block diagram illustrating an embodiment of the table look-ups of FIG. 21 in more detail.

DETAILED DESCRIPTION

Throughout the drawings, the same reference characters will be used for corresponding or similar elements.

The technology disclosed herein relates to image and graphic processing, and in particular to encoding or compressing alpha images and decoding or decompressing encoded (compressed) alpha images.

Generally, according to the technology disclosed herein, during image encoding, an alpha image is decomposed or divided into a number of image blocks. Each such image block then comprises multiple, i.e. at least two, image elements having image element associated properties, among others, a certain color and an associated alpha or transparency value. The image blocks are then encoded or compressed to generate an encoded representation of the image.

When an encoded image is to be displayed on a screen, or a geometric primitive associated with the encoded image is to be rendered, the relevant image elements of the encoded image blocks are identified and decoded. These decoded image elements can then be used to generate a decoded representation of the original image for display, or they can be used for rendering the geometric primitive.

The technology disclosed herein is well adapted for usage with three-dimensional (3D) graphics and images, such as photos, text and "synthetic" images, all of which can be used in applications, such as games, 3D maps and scenes, 3D messages, e.g. animated messages, screen savers, man-machine interfaces (MMIs), etc., but is not limited thereto. Thus, the technology disclosed herein could also be employed for encoding other types of images or graphics, e.g. one-dimensional (1D), two-dimensional (2D) or 3D images.

In the technology disclosed herein the expression "image element" refers to an element in an image block or encoded (compressed) representation of an image block. This image block, in turn, corresponds to a portion of an image or texture.

Thus, according to the technology disclosed herein, an image element could be a texel of a (1D, 2D or 3D) texture or a pixel of a (1D, 2D or 3D) image. Correspondingly, an image element could be a voxel in a 3D texture or image. Generally, an image element is characterized by certain image-element-associated properties, such as a color value and an alpha or transparency value. Furthermore, in the following, the term "image" is used to denote any 1D, 2D or 3D image or texture that can be encoded and decoded by means of the technology disclosed herein.

As was briefly mentioned above, an image element is often characterized by, among others, a color. This color could be a single-component (one-dimensional) property, typically a grey level or value. In such a case, the color of an image element can take a value from a minimum grey level, e.g. 0, typically representing black to a maximum grey level, e.g. 255, typically representing white. Alternatively, the color of an image element could be a multi-component (multi-dimensional) property, typically comprising three color components. In such a case, the color could be a RGB (Red, Green, Blue) color, a color in the YUV space, a color in the YCrCb space, or any other color space used in image and graphics processing. In the following, the technology disclosed herein will mainly be described with reference to RGB color. This should, however, merely be seen as an illustrative, but non-limiting, example of a suitable color format. The corresponding description can, thus, also be applied to other multi-component color formats and single component color formats, e.g. grey level.

In the art of alpha image processing, alpha values are used to represent the transparency property of an image element. Generally, an alpha value is typically defined as alpha_value=1−transparency, if $0 \leq$ alpha_value$\leq 1$ and $0 \leq$ transparency$\leq 1$. Thus, an alpha value of 1 corresponds in this definition to non-transparency or opacity (transparency is 0), whereas an alpha value of 0 then represents full transparency (transparency is 1). Although this definition of alpha values is the most common in the art, the technology disclosed herein is not limited thereto. Actually, an alpha value of an image element can, thus, according to the technology disclosed herein represent any transparency property of that image element depending on the employed alpha value-transparency relationship.

It is anticipated by the technology disclosed herein that the image elements of an "alpha image" in addition to their respective alpha values also have associated color values. Thus, an alpha image of the technology disclosed herein could be a so-called RGBA-image.

Image Encoding

Figure 1:
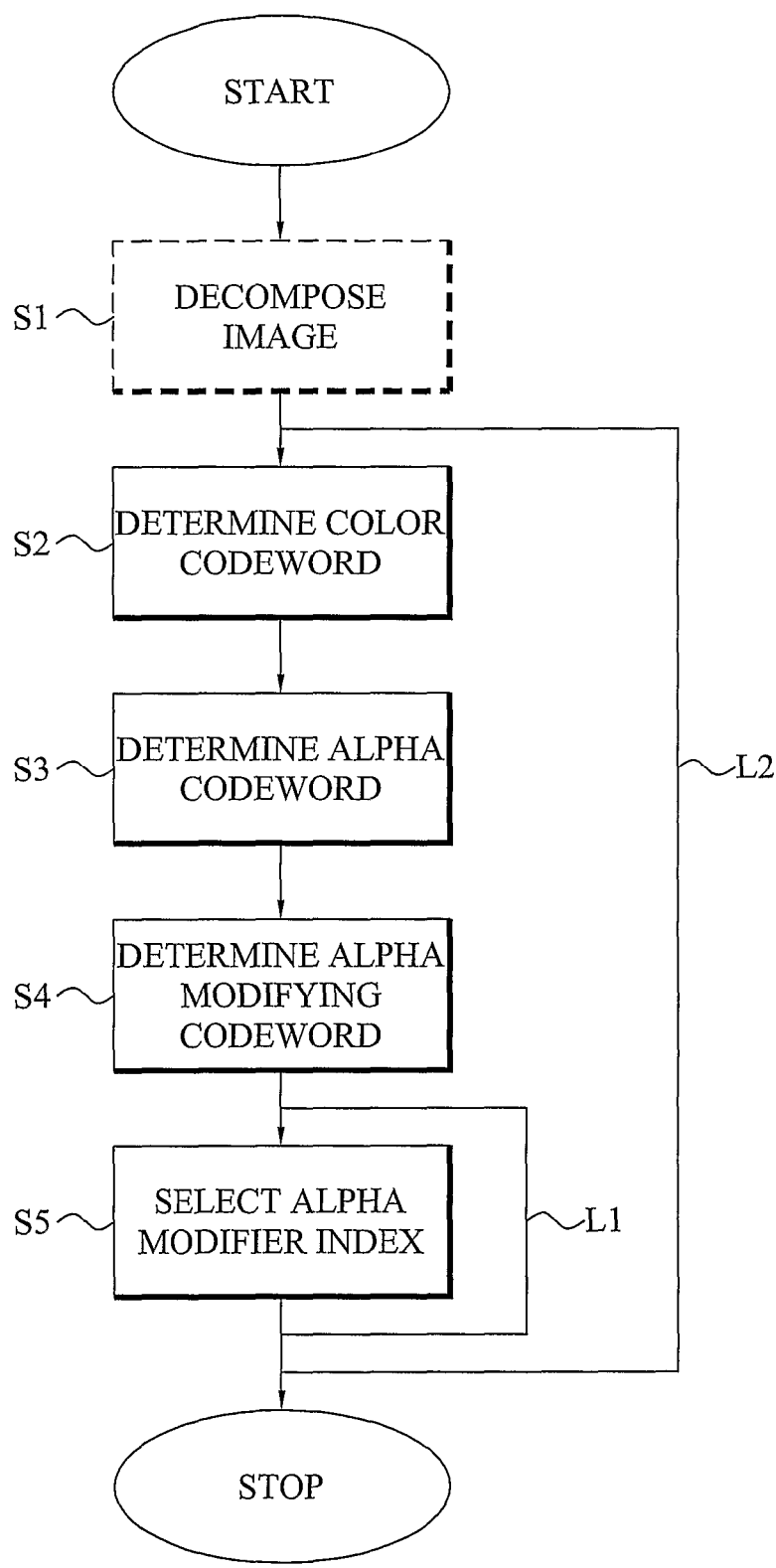
FIG. 1 is a flow diagram illustrating an example embodiment of an image encoding method.
Figure 2B:
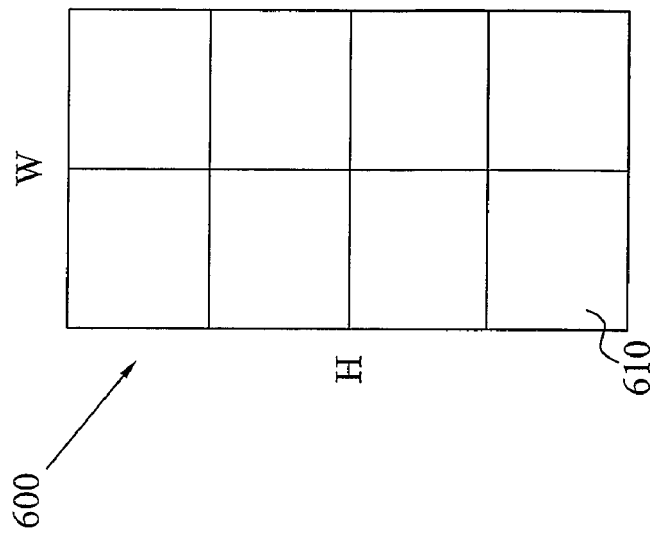
FIGS. 2A and 2B illustrate example embodiments of an image block.
Figure 2A:
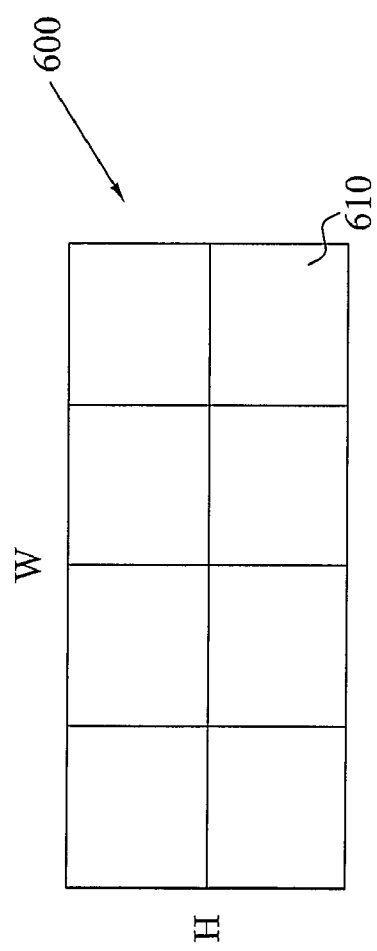

FIG. 1 is a flow diagram of an embodiment of the (lossy) method of encoding an alpha image according to the technology disclosed herein. In a first step S1, the image is decomposed or divided into a number of image blocks. Each such image block then comprises multiple image elements. In a preferred example embodiment, an image block comprises eight image elements (pixels or texels) and has a size of $2^m \times 2^n$ image elements, where m=3−n and n=0, 1, 2, 3. More preferably, n is 1 or 2. FIGS. 2A and 2B schematically illustrate two examples of an image block 600 with eight image elements 610 according to the present invention. In FIG. 2A, the height is two image elements 610 and the width is four image elements 610, i.e. m=1 and n=2, whereas for the image block 600 in FIG. 2B m=2 and n=1. Correspondingly, when compressing 3D images, apreferred image block size could be 2×2×2 image elements (voxels).

However, the technology disclosed herein is not limited to blocks with eight image elements but could alternatively be used in connection with image blocks having less, e.g. 2×2, or more than eight image elements, e.g. 4×4 image elements.

Returning to FIG. 1, the whole image block is preferably decomposed into (non-overlapping) image blocks in step S1. However, in some applications, only a portion of an image is encoded and, thus, only this portion is decomposed into image blocks.

In step S2, a color codeword is determined for the image block. This color codeword is a representation of the colors of the image elements in the image block. In a typical implementation, the color codeword is a representation of an average color of the image elements of the block but could alternatively represent multiple color values. The color codeword is preferably in the same color format (space) as the original image. However, in some cases, it may be useful to convert the image to a different color format, i.e. having the color codeword in a first color space and the original image in a second different color space. In a next step S3, an alpha codeword is determined for the current image block. This alpha codeword is a representation of the alpha values of the image elements in the image block. In a typical implementation, the alpha codeword is a representation of an average alpha value of the image elements in the block.

Thereafter, an alpha modifying codeword is provided in step S4. This alpha modifying codeword is a representation of a set of multiple alpha modifiers that are used (during decoding) for modifying the alpha representation of the image elements in the image block.

In a preferred example embodiment, the alpha modifying codeword is an index or representation allowing identification of an alpha modifier set. This index could then identify or point to the set in an alpha table or codebook comprising several different alpha modifier sets. Each set comprises two or more alpha modifier values, preferably at least four modifier values.

The alpha table preferably comprises sets including small alpha modifier values, which are adapted for allowing representation of smoothly changing transparency properties. In addition, the table preferably also comprises sets that include large alpha modifier values, which are adapted for allowing representation of sharp transparency contrast.

The actual alpha modifier values of the sets in the table can be found by starting with random values and then optimizing these values using a number of different optimization schemes and algorithms, such as versions of the LBG-algorithm (Linde, Buzo and Gray) [2], simulated annealing and coordinate search, which are known to a person skilled in the art. A handful of alpha images of different types can be used as training data.

In order to make a hardware implementation of the alpha table less expensive, the alpha modifiers of a set can be forced to be mathematically complementary values, i.e. each set is preferably symmetrical, and/or the alpha modifiers of a given set could be a copy of alpha modifiers of another set modified by a factor, e.g. two.

Table 1 illustrates a non-limiting example of an alpha table comprising 16 sets of alpha modifiers, with four modifier values in each set.

TABLE 1

| Set | Codeword | Alpha modifier value | | | |
|---|---|---|---|---|---|
| 0 | $0000_{bin}$ | −8 | −2 | 2 | 8 |
| 1 | $0001_{bin}$ | −12 | −4 | 4 | 12 |
| 2 | $0010_{bin}$ | −31 | −6 | 6 | 31 |
| 3 | $0011_{bin}$ | −34 | −12 | 12 | 34 |
| 4 | $0100_{bin}$ | −50 | −8 | 8 | 50 |
| 5 | $0101_{bin}$ | −47 | −19 | 19 | 47 |
| 6 | $0110_{bin}$ | −80 | −28 | 28 | 80 |
| 7 | $0111_{bin}$ | −127 | −42 | 42 | 127 |
| 8 | $1000_{bin}$ | −16 | −4 | 4 | 16 |
| 9 | $1001_{bin}$ | −24 | −8 | 8 | 24 |
| 10 | $1010_{bin}$ | −62 | −12 | 12 | 62 |
| 11 | $1011_{bin}$ | −68 | −24 | 24 | 68 |
| 12 | $1100_{bin}$ | −100 | −16 | 16 | 100 |
| 13 | $1101_{bin}$ | −94 | −38 | 38 | 94 |
| 14 | $1110_{bin}$ | −160 | −56 | 56 | 160 |
| 15 | $1111_{bin}$ | −254 | −84 | 84 | 254 |

In Table 1, the alpha modifier sets 8-15 are a copy of sets 0-7 multiplied by a factor of two.

If the alpha table comprises at most 16 different alpha modifier set, the alpha codeword is preferably a 4-bit index ($0000_{bin}$-$1111_{bin}$) identifying one of the (eight) sets, e.g. [−8, −2, 2, 8] for codeword $0000_{bin}$, of the table. Due to careful choice of the modifier values in the sets, the entire Table 1 can be reconstructed using only 16 modifier values and the remaining 48 values could be calculated therefrom.

The technology disclosed herein is, though, not limited to usage of Table 1, but could use other tables with other alpha modifier sets and values. Furthermore, for more or less than 16 sets in a table, the size of the alpha codeword might have to be changed. For example, if the table comprises two (3-4, 5-8 or more than 16) alpha modifier sets, the alpha codeword size could be limited to one bit (two bits, three bits or more than four bits). In addition, the number of alpha modifier values per set could differ from four, e.g. five values could be used per set, giving an example of [−8, −2, 0, 2, 8].

The alpha values of the sets in the table could be determined using several different types of images as training data, as was discussed above. However, if only a specific image type is to be encoded the modifier values could be determined using training data corresponding to that image type, i.e. giving an alpha table dedicated for a specific image type. It could also be possible to have an alpha table with intensity modifier values adapted for a specific image. In these cases, i.e. table dedicated for image or image type, it might be necessary to include the intensity modifier values of the table in the compressed file of encoded image blocks or otherwise associate them therewith.

In addition, the alpha codeword does not have to be a pointer to an alpha modifier set in a table, but could actually be an alpha modifier set itself, e.g. comprises two modifier values, such as 2 and 8, and where the other modifier values, such as −2 and −8, can be determined from these two values. Alternatively, the alpha modifier sets employed could be according to [−ka, −a, a, ka] or [−$k_2$a, −$k_1$a, $k_1$a, $k_2$a], where a is 0 or a positive integer and k, $k_1$ and $k_2$ are multiplication factors. In such a case, the alpha codeword only needs to include the value a and all the remaining three values can be calculated therefrom if k or $k_1$ and $k_2$ are pre-defined multiplication factors.

Once the alpha codeword is provided in step S4, a next step S5 selects alpha modifier indices or representations for the image elements in the image block. Each such alpha modifier index is associated with one alpha modifier value from the alpha modifier set provided in step S4. In other words, the alpha modifier index allows identification of which alpha modifier of the set to use for a specific image element in the block.

In the case of an alpha modifier set comprising four modifier values, such as −8, −2, 2, 8, the alpha modifier index could be a 2-bit sequence identifying one of these four values.

Step S5 is preferably repeated for all image elements in the block, which is schematically illustrated by the line L1.

The result of the encoding of steps S2 to S5 is an encoded image block or more precisely an encoded (compressed) representation of the image block. Such an encoded block representation 700 is illustrated in FIG. 3A. The representation 700 comprises the color codeword 710, the alpha codeword 720, the alpha modifying codeword 730 and a sequence or bitmap 740 of alpha modifier indices. Note that the mutual order of the color codeword 710, alpha codeword 720, alpha modifying codeword 730 and alpha modifier index sequence 740 of the encoded image block 700 may differ from what is illustrated in the figure. Note also that the codewords and index sequence do not need to be laid out consecutively.

The steps S2 to S5 are preferably repeated for all image blocks provided during the decomposing of step S1 (schematically illustrated by line L2). The result is then a sequence or file of compressed image blocks. The resulting compressed image blocks could be ordered in a file from left to right and top to bottom in the same order in which they were broken down in the block decomposing of step S1. The method then ends.

The encoded image could be provided to a memory for storage therein until a subsequent rendering, e.g. display, of the image. Furthermore, the encoded image could be provided as a signal of encoded block representations to a transmitter for (wireless or wired) transmission to another unit.

FIG. 4 is a flow diagram illustrating an embodiment of the color determining step S2 of FIG. 1 in more detail. The method continues from step S1 of FIG. 1. In a next step S10, an average color of the image elements in the image block is determined. In the following, it is assumed that the color of an image element is represented by 24 bits of RGB color, i.e. 8 bits of the red color component, 8 bits or the green component and 8 bits of the blue component. However, the invention is not limited to this particular example, but can be applicable to any color representation of image elements. The average color ($\bar{R}, \bar{G}, \bar{B}$) is then determined as:

$$\bar{R} = \frac{1}{N}\sum_{i=1}^{N} R_i \quad (1)$$

$$\bar{G} = \frac{1}{N}\sum_{i=1}^{N} G_i$$

$$\bar{B} = \frac{1}{N}\sum_{i=1}^{N} B_i,$$

where $R_i$, $G_i$, $B_i$ are the R, G, B component of image element i and N is the total number of image elements in the image block.

Once the average color ($\bar{R}, \bar{G}, \bar{B}$) is determined in step S10, a next step S11 quantizes the average color into a quantized color that will be used as color codeword in this embodiment. In the color quantizing the 24-bit average color could be quantized into e.g. a 9-bit, 12-bit or 15-bit sequence, but preferably quantized into an 18-bit sequence. In such a case, each 8-bit average color component is quantized into a 6-bit average component (or 3-bit, 4-bit, 5-bit for a total of 9, 12, 15 bits). Note further that the respective sizes in terms of number of bits of quantized color components in the color codeword may differ. For example, size(G)≧(size(R) or size(B)).

If the average color $\bar{R}, \bar{G}, \bar{B}$ is calculated to:

$$\begin{bmatrix} 178 \\ 88 \\ 21 \end{bmatrix} = \begin{bmatrix} 10110010 \\ 01011000 \\ 00010101 \end{bmatrix}_{bin},$$

a 6-bit quantized version ($\hat{R}, \hat{G}, \hat{B}$) could be generated from:

$$\begin{bmatrix} 178 \\ 89 \\ 20 \end{bmatrix} = \begin{bmatrix} 10110010 \\ 01011001 \\ 00010100 \end{bmatrix}_{bin},$$

i.e. [101100, 010110, 000101] bin could be used as a (12-bit) color codeword. Note though that in cases where the original image element colors includes only one component, e.g. grey level (L), a corresponding average grey level $\bar{L}$ is calculated in step S10 according to equation 2:

$$\bar{L} = \frac{1}{N}\sum_{i=1}^{N} L_i \quad (2)$$

where $L_i$ is the grey level of image element i and N is defined as in equation 2. This single average grey level can then be quantized in step S11 and used as color codeword. In such a case, the color codeword preferably includes a quantized average grey level.

A next step S12 determines an intensity or color modifying codeword and selects intensity or color modifier indices for the image elements. Correspondingly to the alpha modifying codeword, this color modifying codeword is a representation of a set of multiple color modifiers that are used (during decoding) for modifying the color representation (intensity) of the image elements in the image block.

In a preferred embodiment of the technology disclosed herein, the color modifying codeword is an index or representation allowing identification of a color modifier set. This index could then identify or point to the set in a color or intensity table or codebook comprising several different color modifier sets. This table could be organized in a similar manner as Table 1, i.e. includes 16 different modifier sets which include symmetrical modifier values and where a first portion of the modifier sets is a factor two of the modifier sets in a second portion.

The actual color modifier values in such a color table may differ from the corresponding alpha modifier values in the alpha table. However, in some applications it will be possible to use the same color modifier values as alpha modifier values. In order to save storage areas a single combined alpha and color table, e.g. according to Table 1, could then be employed. This is in particular true if the maximum and minimum alpha values are the same as the maximum and minimum color (component) values, e.g. 255 and 0. Even though the same alpha and color table is used, the alpha modifying codeword is preferably independent from the color modifying codeword. In other words, it could be possible that the two modifying codewords include the same bit-pattern (table index) for some image blocks but for most image blocks it is expected that the two modifying codewords will differ. In either case, the alpha modifying codeword and the color modifying codeword could be organized or grouped together into a general modifying codeword in the compressed image block. Then this general modifying codeword will include the alpha modifying (sub)codeword and the color modifying (sub)codeword.

In other applications, the alpha modifying codeword could have a combined alpha modifying and color modifying coding functionality. Thus, the modifier set identified, e.g. from a table, using this alpha modifying codeword will be used both for modifying the alpha value represented by the alpha codeword and the color component(s) represented by the color codeword. This combined modifying functionality of the alpha codeword saves the extra bits that otherwise would be spent on a dedicated color modifying codeword. However, these extra bits typically come at the cost of poorer color (or alpha) coding.

Once the color modifier set has been selected and color modifier codeword has been determined, the step S12 continues with selecting color modifier indices or representations for the image elements in the image block. Each such color modifier index is associated with one color modifier value from the selected color modifier set. In other words, the color modifier index allows identification of which color modifier of the set to use for a specific image element in the block.

Step S12 is preferably repeated for image elements in the block, which is schematically illustrated by the line L3. The method then continues to step S3 of FIG. 1.

An image block compressed 700 using this embodiment of the color management and codeword generation is illustrated in FIG. 3B. The representation 700 comprises the color codeword 710, the alpha codeword 720, the alpha modifying codeword 730 and the alpha modifier index sequence 740 as for the compressed block of FIG. 3A. In addition, the compressed block 700 further includes the color modifier codeword 750 and the color modifier index sequence 760. Remember that in some embodiments the alpha 730 and color 750 modifying codewords could be organized into a general modifying codeword, whereas in some other implementations the color modifying codeword 750 could be omitted so that both the alpha and color modifying functionality is encoded by the alpha modifier codeword 730. Note that the mutual order of the color codeword 710, alpha codeword 720, alpha modifying codeword 730, color modifying codeword 750, alpha modifier index sequence 740 and color modifier index sequence 760 of the encoded image block 700 may differ from what is illustrated in the figure. Note also that the codewords and index sequences do not need to be laid out consecutively.

If the image block comprises eight image elements (see e.g. FIGS. 2A and 2B) and each alpha and color modifier index is 2 bits, the two modifier index sequences 740, 760 will be 16 bits each. Furthermore, assume that the corresponding size of the alpha codeword 720, alpha modifying codeword 730 and color modifying codeword 750 is 6 bits, 4 bits and 4 bits, respectively. If the color codeword includes three 6-bit color components the total size of the encoded representation 700 of the image block is 64 bits and a compression rate of 8 bpp is obtained.

FIG. 5 is a flow diagram illustrating another embodiment of the color determining step of FIG. 1. The method continues from step S1 in FIG. 1. In a next step S20 a first and a second color subcodeword are determined. These first and second subcodewords are representations of the colors of the image elements in the image block, preferably representations of a first and a second portion of the image elements in the block, respectively.

The color processing according to FIG. 4 is particularly suitable for compressing image blocks having image elements of similar chrominance (color hues) but different luminance and preserves the luminance components better than the chrominance components. The color processing according to this FIG. 5 is in particular effective for compressing image blocks, the image elements of which are distributed into two clusters in the color space. In addition, assume that the color table used in FIG. 4 only contains non-zero color modifiers. In such a case, color processing of FIG. 4 is not particularly suitable for compressing an image block where the color codeword exactly represents a desired color for all image elements. Since all color modifiers have a non-zero value, this desired color cannot be obtained during decoding when a color modifier value should be added, for each image element, to the color representation. However, in the color processing of FIG. 5 at least one of the two color subcodewords can exactly represent this desired color, allowing a more accurate compressed representation of the image block.

Color indices pointing to or associated with one of the two color subcodewords are selected in next step S21. In a first embodiment, each image element in the block is associated with a respective color index. However, in a preferred example embodiment, resulting a smaller total size of the compressed block representation, a subset of the image elements in the block is associated with a pre-defined color subcodeword selected from the first or second subcodeword. As a consequence, no selection or assignment of color index has to be performed for this (these) image element(s). For example, the first (last) image element could always be associated with the first (or second) color subcodeword. The color index sequence does then not need to contain a color index for this first (last) image element. As a consequence, the sequence will only contain 7 color indices in the case of an image block with totally 8 image elements. It is anticipated by the technology disclosed herein that more than one image element could be pre-associated with a color subcodeword.

The step S21 is preferably repeated for all image elements of the block for which a color index should be generated, which is schematically illustrated by the line L4. The method then continues to step S3 of FIG. 5.

An image block compressed 700 using this embodiment of the color management and codeword generation is illustrated in FIG. 3C. The representation 700 comprises the color codeword that includes the first color subcodeword 710A and the second color subcodeword 710B and a sequence or bitmap 770 of color indices (preferably one intensity index for only a subset of the image element in the block) in addition to the alpha codeword 720, alpha modifying codeword 730 and the alpha modifier index sequence 740. Note that the mutual order of the first color subcodeword 710A, second color subcodeword 710B, alpha codeword 720, alpha modifying codeword 730, color index sequence 770 and alpha modifier index sequence 740 of the compressed image block 700 may differ from what is illustrated in the figure. Note also that the codewords and index sequences do not need to be laid out consecutively.

The two color subcodewords determined in FIG. 5 can be generated by first determining an average color or center of gravity of the image elements in the image block is determined. Thereafter an optimal line passing through the average color point in the color space is computed. This optimal line can be determined using principal component analysis, which is well known to the person skilled in the art. Briefly, this optimal line is chosen as a straight line in the color space that passes through the average color point such that it minimizes the "moment of inertia" (the mean square error). Two points on this line are selected, quantized and used as color subcodewords. In a first embodiment, the variance of the projections of the image element colors onto the optimal line is calculated. The two points on the line that are at a distance of about three quarters of the variance from the average color point are identified. The color components of the two selected points (one on either side of the average color point along the line) are then quantized. These quantized values are then used as color subcodewords.

In an alternative implementation of the color subcodeword determination, the color values of the image elements in the block are quantized. An exhaustive search is then performed among the quantized color values. The result of this search is two quantized color values (note though that these two color values could be equal) that minimizes the error value associated with employing these two selected color values as color subcodewords for the block. The two optimal quantized color values can then be used directly as color subcodewords. However, optionally an exhaustive search of suitable subcodewords is performed among the color points within a pre-defined distance from each selected color value. The optimal quantized color values (in the sense of minimizing an associated error value) found in the search are used as color subcodeword.

In an extension of the color processing of FIG. 5, the first and second color subcodewords are determined in step S20 e.g. according to one of the embodiments mentioned above. However, in this embodiment at least three color representations can be generated using the two color subcodewords. In such a case, a first color representation can be generated by expanding the first color subcodeword, a second color is generated by expanding the second color subcodeword and at least a third color representation is generated by expanding a linear combination of the first and second color subcodeword.

Such linear combinations could be $w \times 1^{st}$ subcodeword+ $(1-w) \times 2^{nd}$ subcodeword, where $0 < w < 1$.

Note that the two color subcodewords are typically both of the same size. However, the present invention is not limited thereto. For example, the first color subcodeword could be represented at a higher resolution than the second subcodeword, so that it contains more bits than the second color subcodeword.

The two different color processings disclosed in FIGS. 4 and 5 could be regarded as two available compression modes. Thus, compressing an image block according to the first compression mode, i.e. according to FIGS. 1 and 4, results in the compressed block representation of FIG. 3B, whereas compressing the block according to the second mode, i.e. according to FIGS. 1 and 5, results in the compressed block of FIG. 3C. It could then be advantageous to compress some of the image blocks of a given alpha image according to the first compression mode and other blocks of the image according to the second compression mode. In such a case, a portion of the blocks in the resulting encoded image would typically be according to FIG. 3B while the remaining blocks would then be according to FIG. 3C.

The use of two different compression modes provides flexibility to the encoding method by being able to better adapt to the individual properties of the image blocks. As a consequence of having a choice, per block, between the two different compression modes, the image quality of the processed alpha image is improved compared to the prior art encoding schemes with a single (fixed) encoding.

In order to determine which of these two operational modes to employ for a given image block, the block could be compressed according to both compression modes. Thereafter the compressing mode and compressed block representation to use is preferably selected based on a comparison of error representations associated with the two encoded blocks. These error representations are measures indicative of image quality representations associated with compressing the image block according to the first or second mode. Thus, the compression mode and compressed image block resulting or associated with the smallest error representation will be selected.

This error representation generation basically includes generating a first decompressed or decoded representation of the image block using the image block representation (700 in FIG. 3B) compressed according to the first compression mode. Correspondingly, a second decompressed representation of the image block is generated using the image block representation (700 in FIG. 3C) compressed according to the second compression mode. The procedure of decompressing the block will be described in more detail below in the decoding discussion.

The error value indicative of representing the original image block with this first and second decompressed block representation is calculated. Let $R_0^i$ ($G_0^i$, $B_0^i$) denote the value of the red (green, blue) color component of image element i in the original (unprocessed) image block and $R_d^i$ ($G_d^i$, $B_d^i$) denote the corresponding resulting red (green, blue) color component of image element i in the first decompressed block representation. The error value can then be calculated as:

$$\varepsilon^2 = \sum_{i=1}^{N} \left[ (R_d^i - R_0^i)^2 + (G_d^i - G_0^i)^2 + (B_d^i - B_0^i)^2 \right], \quad (3)$$

where N is the total number of image elements in the block. Optionally component-specific weights $w_R$, $w_G$, $w_B$ could be used in equation (3). A corresponding error value is also calculated for the second compressed block and mode. The two resulting error values are then compared and the smallest is identified. The compression mode and compressed block associated with this identified error value will be used for the current block.

Alternatively, the selection of compression mode is performed in advance of the actual processing (compression) of an image block. As a consequence, only a single compressed block representation has to be generated per image block. This early mode selection is preferably made based on an investigation of the properties of the image elements in the block. In a preferred embodiment, the selection is, at least partly, based on the distribution of the colors of the image elements in the relevant color space.

As has been mentioned in the foregoing, the two compression modes are adapted for somewhat different image blocks. For example, the first compression mode is highly suitable for usage when the colors of the image elements in the block are on or at least close to the line:

$$\begin{bmatrix} R \\ G \\ B \end{bmatrix} = \begin{bmatrix} 1 \\ 1 \\ 1 \end{bmatrix} t + \begin{bmatrix} \bar{R} \\ \bar{G} \\ \bar{B} \end{bmatrix}, \quad (4)$$

where $\overline{RGB}$ is the average color of the image elements in the block and $t \in [-\infty, \infty]$. Thus, the first compression mode is suitable for compressing image blocks, the image elements of which are on or close to the line (4) passing the average color point and has a slope of one in the RG-, RB- and GB-planes. However, the second compression mode is more suitable if the image block includes image elements having color values far from the above-identified line, and in particular grouped into two clusters.

A discrimination based on the color value distribution can be realized by comparing a vector (v1) parallel with the optimal line discussed in connection with FIG. 5 to a vector (v2) parallel with the above-discussed line (4). If the angle ($\theta$) between the two vectors are smaller than a threshold angle ($\phi$), i.e.

$$\theta = \arccos\left( \frac{v1 \cdot v2}{|v1||v2|} \right) < \varphi, \quad (5)$$

the first compression mode is selected, otherwise the second mode is selected. Once the compression mode to use is selected the current image block is compressed according this selected mode.

In order to enable identification of which compression mode that has been used for a given image block, which is important during the decompression, the compressed image block representations 700 in FIGS. 3B and 3C can include a mode index. This mode index could be a 1-bit index where $0_{bin}$ ($1_{bin}$) is used for the compressed block representation according to FIG. 3B (FIG. 3C). If the total size of the compressed block 700 in FIG. 3B in terms of the number of bits is to remain the same with the addition of this mode index, the size of e.g. the alpha codeword 720 can be reduced by one bit, thus, preferably now being 5 bits.

In a preferred example implementation, the sizes (number of bits) of the resulting block representation compressed are the same irrespective of the compression mode used. In such a case, the total size of the compressed block representation in FIG. 3C is preferably also 64 bits. This can be obtained by using a 1-bit mode index, two 15-bit color subcodewords 710A, 710B, a 6-bit alpha codeword 720, 4-bit alpha modifying codeword 730, 7-bit color index sequence (one 1-bit color index for each image element except the first image element in the block which is pre-defined associated with the first color subcodeword 710A) and 16-bit alpha modifier index sequence 740.

It is expected that a (vast) majority of the image blocks of most alpha images will be comprssed according to the first compression mode when employing a choice between the first and second mode. In the above-discussed preferred implementation of the two modes, both modes have access to 63 "useful" bits that can be used for compressing the image blocks. A remaining single bit is then used as mode index. In an alternative example embodiment, a different kind of mode index than a single bit is used. That mode index will then enable a different amount of allocated "useful" bits to the two compression modes but still preserves the total size of the compressed image block.

In this embodiment, the single mode bit is omitted, which frees 1 bit. The entries of the color table will be used for discriminating between the two modes. As a consequence, only a portion of the color table entries, e.g. 12 out of these 16 entries, will be used as color modifier sets. The remaining (four) table entries are mode indices signaling the second compression mode.

For example, a 4-bit word of $0001_{bin}$-$0011_{bin}$, $0101_{bin}$-$0111_{bin}$, $1001_{bin}$-$1011_{bin}$ and $1101_{bin}$-$1111_{bin}$ could represent a color modifying codeword and signal that the first compression mode should be used. Thus, in this first compression mode the mode index and the color modifying codeword share the same four bits.

In this embodiment, a modified color table can be used for enhancing the luminance resolution of the image block in the first mode. At first sight, this resolution boost of the first mode comes at the cost of three less useful bits (four less useful bits due to the mode index, $0000_{bin}$, $01000_{bin}$, $1000_{bin}$ or $1100_{bin}$, but one extra useful bit due to omitting the single mode bit) for the second compression mode. However, by careful investigation of the proposed "mode 2"-specific mode indices, we notice that the two LSBs are identical ($00_{bin}$) for all of these mode indices. As a consequence, the two MSBs can be employed for representing "useful" data, e.g. color subcodeword, alpha codeword, alpha modifying codeword, color index or alpha modifier index data. As a consequence, the extra 1-bit boost for the first compression mode only comes at the cost of one less useful bit for the second compression mode. This single bit is preferably taken from the second color subcodeword, more preferably from the blue color component of the second subcodeword.

FIG. 6 is a flow diagram illustrating the steps of determining alpha codeword, determining alpha modifying codeword and selecting alpha modifier index of FIG. 1 in more detail. The method continues from step S2 of FIG. 1. In a next step S30, an average alpha value of the image elements in the image block is determined. In the following, it is assumed that the alpha value of an image element is represented by 8 bits, i.e. potentially be from 0 to 255. The average alpha ($\bar{\alpha}$) is then determined as:

$$\bar{\alpha} = \frac{1}{N}\sum_{i=1}^{N} \alpha_i, \qquad (6)$$

where $\alpha_i$ is the alpha value of image element i and N is the total number of image elements in the image block.

Once the average alpha value ($\bar{\alpha}$) is determined in step S30, a next step S31 quantizes the average color into a quantized alpha value that will be used as alpha codeword in this embodiment. The size of the quantized alpha value could be e.g. 3 bits, 4 bits or preferably 5 bits or 6 bits.

A next step S32 investigates the different alpha modifier sets of the alpha table and the different alpha modifier values of the sets and calculates an error value for each such modifier set and modifier value test. Based on these error values, a modifier set and alpha modifier values of the set that results in a smallest error value is selected in step S32. The method then continues to step S2 in FIG. 1 or ends.

Decoding

Figure 7:
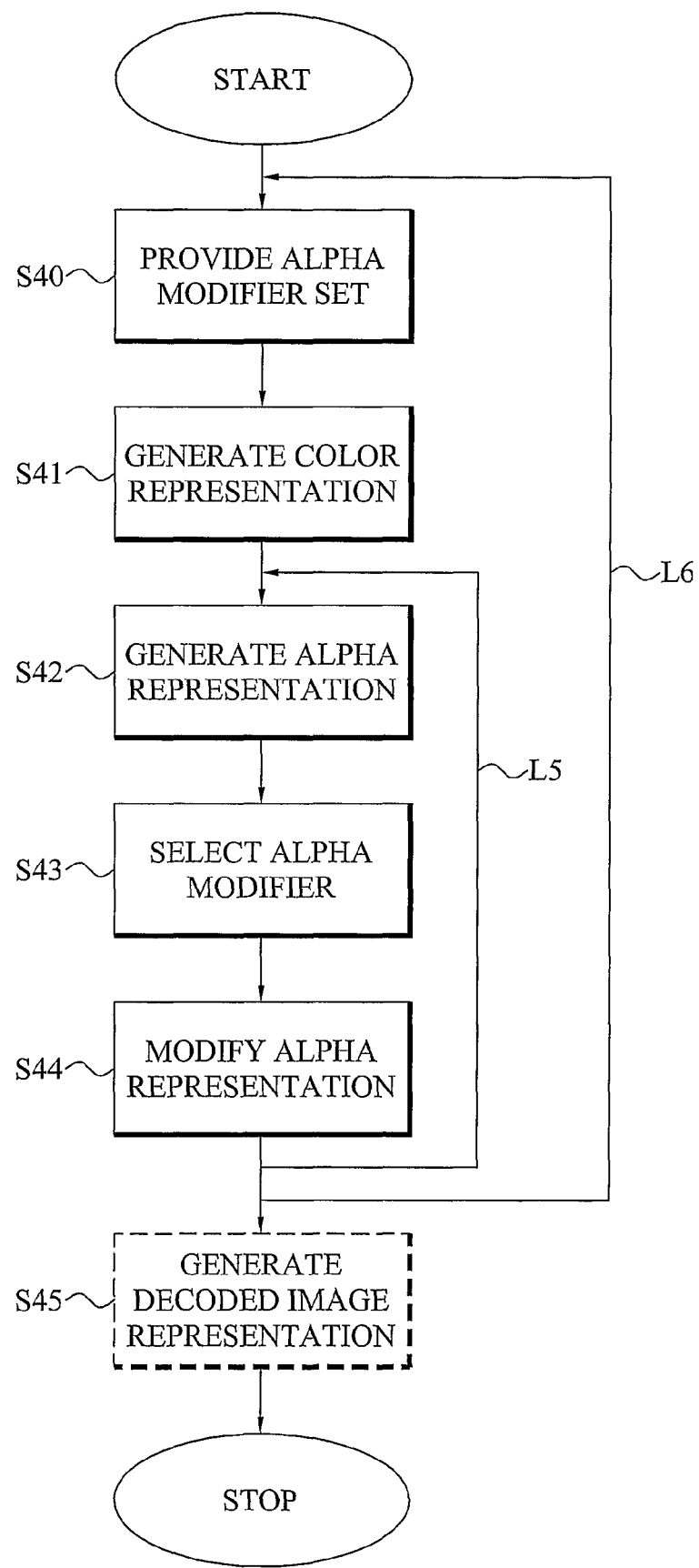
FIG. 7 is a flow diagram illustrating an image decoding method according to the technology disclosed herein.

FIG. 7 illustrates a flow diagram of a method of decoding an encoded image or encoded version of an original image according to the technology disclosed herein. The encoded image basically comprises several encoded representations of image blocks, such as representations 700 of FIG. 3A, 3B or 3C. These encoded block representations are preferably generated by the image encoding method discussed above in connection with FIG. 1.

The method generally starts by identifying encoded image block(s) to decode. It could be possible that all encoded image blocks of an encoded image should be decoded to generate a decoded representation of the original image. Alternatively, only a portion of the original image is to be accessed. As a consequence, only a selected number of image blocks have to be decoded (or more precisely, a selected amount of image elements of certain image blocks have to be decoded).

Once the correct encoded image block is identified, step S40 provides an alpha modifier set. This modifier set is provided based on the alpha modifying codeword in the compressed block representation. This set provision is preferably performed by identifying, by means of the alpha modifying codeword, an alpha modifier set from a table, e.g. Table 1 above, comprising multiple modifier sets. However, in some applications it might be possible that the alpha modifying codeword itself comprises the modifier set and that no table look-up is required.

In a next step S41, a color representation is generated for at least one of the image elements of the image block (i.e. for the image element(s) that should be decoded). This color generation is performed based on the color codeword in the compressed block.

The following step S42 generates an alpha representation for the at least one image element based on alpha codeword. In step S43, the alpha modifier to use for the image element that should be decoded is selected. The modifier value is selected from the modifier set provided in step S40 based on the alpha modifier index associated with the image element and found in the alpha modifier index sequence of the compressed block representation. Once the correct intensity modifier value is selected in step S43, the alpha representation of the image element is modified or modulated with this value in step S44. Alpha modification according to the technology disclosed herein refers to modifying, e.g. adding or multiplying, the alpha representation by the alpha modifier value.

Steps S42 to S44 could be performed for several image elements in the image block (schematically illustrated by line L5). It is anticipated by the technology disclosed herein that in some applications, only a single image element is decoded from a specific image block, multiple image elements of a specific image block are decoded and/or all the image elements of a specific block are decoded.

Steps S40 to S44 are then preferably repeated for all image blocks that comprise image elements that should be decoded (schematically illustrated by line L6). This means that the loop of steps S40 to S44 could be performed once, but most often several times for different encoded image blocks and/or several times for a specific encoded image block.

In the optional step S45, a decoded representation of the original image, or a portion thereof, is generated based on the decoded image elements and blocks. Note that in some applications, several image elements have to be decoded in order to render a single pixel, texel or voxel of the decoded representation. For example, during trilinear interpolation, eight image elements are decoded and for bilinear interpolation the corresponding number is four image elements. The method then ends.

FIG. 8 is flow diagram illustrating an embodiment of the color representation generating step of FIG. 7. This embodiment of the color decoding represents a first decoding or decompression mode and is in particular applicable for decompressing image blocks (see FIG. 3B) compressed according the first compressing mode. The method continues from step S40 in FIG. 7. In a next step S50, the quantized color of the color codeword, preferably 15, 16 or 18 bits, is expanded or extended into preferably 24 bits. For the case with a RGB color, each quantized 5-bit or 6-bit color component of the color codeword is then expanded into an 8-bit color component. In other words, a 5-bit color component of $10110_{bin}$ is expanded into $1011\ 01011_{bin}$. This expanded color is then assigned to the image elements of the image block, which are to be decoded.

In the following step S51, a correct color modifier set is identified and selected from the color table (dedicated color table or common color and alpha table) by means of the color modifying codeword. In cases where a common modifying codeword is used for both color and alpha, this common codeword will be used for identifying the correct color modifier set. If the color modifier set stored in the color table comprises a first sub-set of modifier values, e.g. [a, b], a second sub-set of color modifier values can be determined from the values of the first sub-set, e.g. [−a, −b]. In step S52, the identified and selected color modifier value is added to the expanded color. Thus, this modifier value is added to all components (all three for a RGB color or the single component for a grey level color) of the color for the image element. This could be implemented as a simple addition of the modifier value to all color components. However, in some applications it could be preferred to weight the modifier value before adding it to the components. In such a case, different weights can be employed for the different color components.

In an alternative embodiment, another type of modification than a simple addition could be employed, e.g. multiplication or XOR.

In a next optional step S53, the resulting modified color component values are clamped between a minimum color threshold and a maximum color threshold. For example, if after adding the (possibly weighted) color modifier value to a color component, the resulting value is smaller than the minimum threshold, the value is clamped to the value of this threshold. Correspondingly, if the resulting value is larger than the maximum threshold, the value of the threshold should instead be used for that component. A non-limiting example of a minimum and maximum threshold is 0 and 255, respectively, for the case with 256 color component levels. The steps S50 to S53 are preferably repeated for encoded image elements of the compressed block that should be decoded, which is schematically illustrated by the line L7. The method then continues to step S42 of FIG. 7.

FIG. 9 is flow diagram illustrating another embodiment of the color representation generating step of FIG. 7. This embodiment of the color decoding represents a second decoding or decompression mode and is in particular applicable for decompressing image blocks (see FIG. 3C) compressed according the second compressing mode. The method continues from step S40 of FIG. 7. In a next step S60, a color subcodeword is selected from the first or second color subcodeword using a color index associated with the relevant image element and found in the color index sequence.

However, if the relevant image element belongs to the subset of image elements that does not have an associated color index but instead has a pre-defined associated color subcodeword, that pre-defined color subcodeword is identified in step S60. In a next step S61, a color representation for the image element is generated using the selected or pre-defined color codeword by expanding the quantized color of the selected color subcodeword. This color expansion is similar to step S50. The steps S60 and S61 could be performed for several image elements in the image block (schematically illustrated by line L8).

Alternatively, in particular when decompressing multiple image elements in a compressed block representation, a first color representation is generated using the first color subcodeword and a second corresponding color representation is generated using the second color subcodeword or a combination of the first and second subcodeword. The selection for the image elements is then performed among the first and second color representation using the color indices, or one of the first or second color representation is pre-associated with one or some of the image elements in the block.

The method then continues to step S42 of FIG. 7.

The relevant decompression mode to use for a current image block is preferably determined based on the dedicated mode index included in the compressed image block representation. If instead the color modifying codeword, or some of the bits of the color modifying codeword, is used as mode index, these bits are then investigated before generating the color representation of the image block.

FIG. 10 is a flow diagram illustrating the steps of generating alpha representation, selecting alpha modifier and modifying alpha representation of FIG. 7. The method continues from step S41 in FIG. 7. In a next step S70, the quantized alpha value of the alpha codeword, preferably 5 or 6 bits, is expanded or extended into preferably 8 bits. This expanded alpha value is then assigned to the image elements of the image block, which are to be decoded.

In the following step S71, a correct alpha modifier set is identified and selected from the alpha table (dedicated alpha table or common alpha and color table) by means of the alpha modifying codeword. In cases where a common modifying codeword is used for both alpha and color, this common codeword will be used for identifying the correct alpha modifier set. If the alpha modifier set stored in the alpha table comprises a first sub-set of modifier values, e.g. [a, b], a second sub-set of color modifier values can be determined from the values of the first sub-set, e.g. [−a, −b]. In step S72, the identified and selected alpha modifier value is added to the expanded alpha value. This could be implemented as a simple addition of the modifier value to the alpha value. In an alternative embodiment, another type of modification than a simple addition could be employed, e.g. multiplication or XOR.

In a next optional step S73, the resulting modified alpha value is clamped between a minimum alpha threshold and a maximum alpha threshold. For example, if after adding the alpha modifier value to the alpha representation, the resulting value is smaller than the minimum threshold, the value is clamped to the value of this threshold. Correspondingly, if the resulting value is larger than the maximum threshold, the value of the threshold should instead be used for that component. A non-limiting example of a minimum and maximum threshold is 0 and 255, respectively, for the case with 256 levels of alpha. The steps S70 to S73 are preferably repeated for encoded image elements of the compressed block that should be decoded, which is schematically illustrated by the line L9. The method then continues to step S40 or S45 of FIG. 7.

Decoding an encoded image block will further be illustrated by three examples herebelow. An alpha table according to Table 1 will be used.

DECODING EXAMPLE 1

The encoded representation of the image block is according to FIG. 3A and comprises the following data bits 101001 101100 0111 11 01 10 00 10 01 00 00$_{bin}$, where the bit 0-5 is the color codeword, bit 6-11 is alpha codeword, bit 12-15 is the alpha modifying codeword and bit 16-31 is the sequence of alpha modifier indices. In this decoding example 1, the original color of the image block is a grey level.

The color codeword is then decoded (expanded) to generate the color representation of the image block. The 6-bit bit pattern is repeated to generate an 8-bit word. This 8-bit word will include the color codeword as its six MSBs and the two MSBs of the color codeword as its two LSBs: Color representation: 10100110$_{bin}$ ⇔ 166

This expanded color is assigned to the image elements of the image blocks giving:

| (166) | (166) | (166) | (166) |
|---|---|---|---|
| (166) | (166) | (166) | (166) |

The (6-bit) alpha codeword is decoded (expanded) in a similar manner into a (8-bit) alpha representation:

Alpha representation: 10110010$_{bin}$ ⇔ 178

This generated alpha value is assigned to the image elements of the image blocks giving:

| (166; 178) | (166; 178) | (166; 178) | (166; 178) |
|---|---|---|---|
| (166; 178) | (166; 178) | (166; 178) | (166; 178) |

The correct alpha modifier set to use is selected from Table 1 based on the intensity codeword. As is seen in Table 1 an alpha modifying codeword of 0111$_{bin}$ corresponds to alpha modifiers [−127, −42, 42, 127].

The sequence of alpha modifier indices enables identification of which of these four modifier values to use for the different image element according to:

$$\begin{bmatrix} 11_{bin} \\ 10_{bin} \\ 00_{bin} \\ 01_{bin} \end{bmatrix} = \begin{bmatrix} -127 \\ -42 \\ 42 \\ 127 \end{bmatrix}$$

The first alpha modifier index is 11$_{bin}$, which means that the first alpha modifier value, −127, should be added to alpha value the first image element 178−127=51. Since this value of 51 is within the acceptable interval of 0 and 255 no clamping thereof is needed. This procedure is continued with the second image element index 01$_{bin}$, which corresponds to a modifier value of 127. This value is added to 178 resulting in 305. The result is then clamped between 0 and 255, thus giving 255. Repeating this procedure for all image elements in the block would create the final decoded image block shown below:

| (166; 51)  | (166; 255) | (166; 136) | (166; 220) |
|---|---|---|---|
| (166; 136) | (166; 255) | (166; 220) | (166; 220) |

DECODING EXAMPLE 2

The encoded representation of the image block is according to FIG. 3B with an addition of a single mode index and comprises the following data bits 0 101001 101100 001100 0111 10011 0010 11 01 10 00 10 01 00 00 10 01 11 00 10 01 11$_{bin}$, where the bit 0 is a mode index, bit 1-6 is the red component of the color codeword, bit 7-12 is the green component of the color codeword, bit 13-18 is the blue component of the color codeword, bit 19-22 is the color modifying codeword, bit 23-27 is the alpha codeword, bit 28-31 is the alpha modifying codeword, bit 32-47 is the color modifier index sequence and bit 48-63 is the alpha modifier index sequence. The mode bit value of 0$_{bin}$ indicates that the first decompression mode should be used for the current compressed block. In this example Table 1 is used as a combined alpha and color table.

Each color component of the color codeword is expanded into 8-bit color component representations similar to the decoding example 1:

| Red:   | 10100110$_{bin}$ ⇔ 166 |
|---|---|
| Green: | 10110010$_{bin}$ ⇔ 178 |
| Blue:  | 00110000$_{bin}$ ⇔ 48  |

These expanded color components are assigned to the image elements of the image blocks giving:

| (166, 178, 48) | (166, 178, 48) | (166, 178, 48) | (166, 178, 48) |
|---|---|---|---|
| (166, 178, 48) | (166, 178, 48) | (166, 178, 48) | (166, 178, 48) |

The correct color modifier set to use is selected from Table 1 based on the color modifying codeword. As is seen in Table 1 a color modifying codeword of $0111_{bin}$ corresponds to color modifiers [−127, −42, 42, 127]. The first color modifier index is $11_{bin}$, which represents −127 (compare to the decoding example 1). This color modifier value is added to all three color components of the first image element:

$$\begin{bmatrix} 166 \\ 178 \\ 48 \end{bmatrix} + \begin{bmatrix} -127 \\ -127 \\ -127 \end{bmatrix} = \begin{bmatrix} 39 \\ -51 \\ -79 \end{bmatrix}$$

The resulting components are then clamped between 0 and 255, thus giving (39, 0, 0). Continuing this procedure for the remaining image blocks results in the partly decoded image block of:

| | | | |
|---|---|---|---|
| (39, 00, 00) | (255, 255, 175) | (124, 156, 6) | (208, 220, 90) |
| (124, 156, 6) | (255, 255, 175) | (208, 220, 90) | (208, 220, 90) |

The (5-bit) alpha codeword is the decoded (expanded) in a similar manner into a (8-bit) alpha representation:

Alpha representation: $10011100_{bin} \Leftrightarrow 156$

The correct alpha modifier set to use is selected from Table 1 based on the intensity codeword. As is seen in Table 1 an alpha modifying codeword of $0010_{bin}$. corresponds to alpha modifiers [−31, −6, 6, 31]. The alpha representation 156 is modified using the alpha modifier indices. This alpha modification is performed in a similar manner to the color modification. The final decoded image block is shown below:

| | | | |
|---|---|---|---|
| (39, 00, 00; 150) | (255, 255, 175; 187) | (124, 156, 6; 125) | (208, 220, 90; 162) |
| (124, 156, 6; 150) | (255, 255, 175; 187) | (208, 220, 90; 125) | (208, 220, 90; 125) |

DECODING EXAMPLE 3

The encoded representation of the image block is according to FIG. 3C with an addition of a single mode index and comprises the following data bits 1 10100 10110 00110 01101 11110 00000 011110 0010 1100100 10 0111 00 10 01 11 $11_{bin}$, where the bit 0 is a mode index, bit 1-5 is the red component of the first color subcodeword, bit 6-10 is the green component of the first color subcodeword, bit 11-15 is the blue component of the first color subcodeword, bit 16-20 is the red component of the second color subcodeword, bit 21-25 is the green component of the second color subcodeword, bit 26-30 is the blue component of the second color subcodeword, bit 31-36 is the alpha codeword, bit 37-40 is the alpha modifying codeword, bit 41-47 is the color index sequence and bit 48-63 is the alpha modifier index sequence. The mode bit value of $1_{bin}$ indicates that the second decompression mode should be used for the current compressed block.

The color subcodewords is decoded (expanded) to generate the two color representations. Each color component in the color subcodewords is expanded into 8 bits:

| First color representation | |
|---|---|
| Red: | $10100101_{bin} \Leftrightarrow 165$ |
| Green: | $10110101_{bin} \Leftrightarrow 181$ |
| Blue: | $00110001_{bin} \Leftrightarrow 49$ |

| Second color representation | |
|---|---|
| Red | $01101011_{bin} \Leftrightarrow 107$ |
| Green | $11110111_{bin} \Leftrightarrow 247$ |
| Blue: | $00000000_{bin} \Leftrightarrow 0$ |

The first image element is in this example always associated with the first color subcodeword and representation and is therefore assigned the color (165, 181, 49). The color index for the second image element is $1_{bin}$, implying that the second color representation (107, 247, 0) should be assigned to this image element. Continuing this procedure results in the partly decompressed block representation:

| | | | |
|---|---|---|---|
| (165, 181, 49) | (107, 247, 0) | (107, 247, 0) | (165, 181, 49) |
| (165, 181, 49) | (107, 247, 0) | (165, 181, 49) | (165, 181, 49) |

The (6-bit) alpha codeword is the decoded (expanded) in a similar manner into a (8-bit) alpha representation:

Alpha representation: $01111001_{bin} \Leftrightarrow 121$

The correct alpha modifier set to use is selected from Table 1 based on the intensity codeword. As is seen in Table 1 an alpha modifying codeword of $0010_{bin}$ corresponds to alpha modifiers [−31, −6, 6, 31]. The alpha representation 121 is modified using the alpha modifier indices. This alpha modification is performed in a similar manner to the color modification. The final decoded image block is shown below:

| | | | |
|---|---|---|---|
| (165, 181, 49; 115) | (107, 247, 0; 152) | (107, 247, 0; 90) | (165, 181, 49; 127) |
| (165, 181, 49; 115) | (107, 247, 0; 152) | (165, 181, 49; 90) | (165, 181, 49; 90) |

Implementation Discussion

The image encoding (image block encoding) and image decoding (image block decoding) scheme according to the present invention could be provided in a general data processing system, e.g. in a user terminal or other unit configured for processing and/or rendering images. Such a terminal could be a computer or a thin client, such as Personal Digital Assistance (PDA), mobile unit or mobile telephone. Since both encoding and decoding according to the technology disclosed herein can be implemented very easily in hardware, software or a combination of hardware and software, the technology disclosed herein could with advantage be applied to a thin client.

Image Processing Terminal

FIG. 11 illustrates an image processing terminal 100 represented by a mobile unit. However, the technology disclosed herein is not limited to mobile units but could be implemented in other terminals and data processing units. Only means and elements in the mobile unit 100 directly involved in the present invention are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (compressed image blocks) according to the technology disclosed herein.

An image encoder 210 according to the technology disclosed herein is provided in the mobile unit 100. This encoder 210 is configured for encoding an image or texture into an encoded representation of the image (or texture). As was discussed above, such an encoded representation comprises a sequence or file of multiple compressed image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a (texture) cache memory, e.g. in the graphic system 130. A big advantage of the cheap (in terms of complexity) and fast decompression of the technology disclosed herein is that compressed image blocks may, at least temporarily, be stored in the cache for fast and easy access. This is further facilitated by the high compression rate, which allows four times as much image block data to be simultaneously stored in the cache compared to uncompressed (RGBA8888) block data.

An image decoder 220 according to the technology disclosed herein is provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another terminal and decodes it to generate a decoded image representation. Thus, the encoded image signal could be wirelessly transmitted between terminals using radio transmitter and receiver. Alternatively, other techniques for distributing images and encoded image representations between terminals could be employed, such as IR-techniques using IR ports, Bluetooth and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Encoder

FIG. 12 illustrates a block diagram of an embodiment of an image encoder 210 according to the diversity handling unit. The encoder 210 typically comprises an image decomposer 215 for decomposing or dividing an input image into several image blocks. The decomposer 215 is preferably configured for decomposing the image into image blocks comprising eight image elements. This decomposer 215 could be adapted for decomposing different input images into image blocks with different sizes. In such a case, the decomposer 215 preferably receives input information, enabling identification of which image block format to use for a given image.

The image encoder 210 further comprises a block encoder 300. This block encoder 300 encodes the image block(s) received from the image decomposer to generate encoded block representation(s). Such an image block representation comprises at least a color codeword, an alpha codeword, an alpha modifying codeword and an alpha modifier index sequence. The overall size of the block representation is much smaller than the corresponding size of the uncoded image block. The block encoder 300 is preferably configured for processing (encoding) each image block from the decomposer 215 sequentially.

The block encoder 300 preferably comprises, or has access to an alpha table 500 comprising multiple alpha modifier sets. The modifier sets of the alpha table 500 are used for the generation of the alpha modifying codeword. The alpha table 500 could be arranged in the block encoder 300 or elsewhere in the image encoder 210.

This alpha table 500 could a dedicated alpha table or a common alpha and color table. In the former case, the block encoder 300 could then additionally include a color table. It also possible to implement several different tables in the encoder 210, where the alpha modifiers of the tables are adapted for the different for different image types or adapted for a respective specific image. When configure for operating according to multiple compression modes, the same alpha table 500 could be employed in all modes. However, in some applications mode-specific alpha tables 500 could instead be employed.

Although the image encoder 210 of FIG. 12 only includes a single block encoder 300, it can be more advantageous from processing time point of view to implement multiple block encoders 300 in the image encoder 210. By providing multiple block encoders 300, multiple image blocks from the decomposer 215 may be processed (encoded) in parallel, which reduces the total image encoding time. Alternatively, a first subset of the block encoders could be operated for compressing an image block according to the first compression mode and a remaining subset of the encoders are operated according to the second compression mode In cases of multiple block encoders, each block encoder 300 could comprise an alpha table 500. The alpha tables 500 in the different encoders 300 could all include identical alpha modifier values. Alternatively, mode-specific alpha tables could be employed by the encoders 300. In an alternative implementation, a single alpha table 500 is arranged in the image encoder 210 and connected to all block encoders 300.

The units 215 and 300 of the image encoder 210 may be provided as software, hardware or a combination thereof. The units 215, 300 and 500 may be implemented together in the image encoder 210. Alternatively, a distributed implementation is also possible with some of the units provided elsewhere in the user terminal.

FIG. 13 illustrates a block diagram of an embodiment of a block encoder 300 according to the technology disclosed herein, such as the block encoder of the image encoder in FIG. 12. The encoder 300 comprises a color quantizer 310 that generates a color codeword that is representation of the colors of the image elements in the image block. An alpha quantizer 320 is provided in the block encoder 300 for generates an alpha codeword that is a representation of the alpha values of the image elements in the block.

An alpha modifier provider 330 is implemented in the block encoder 300 for identifying an alpha modifier set to use for a current image block. The provider 330 is preferably configured for selecting this modifier set from an associated alpha table 500. The modifier provider 330 then generates an alpha modifier codeword that is associated with the selected alpha modifier set.

The encoder 300 further includes an index selector 340 that selects image element associated alpha modifier indices for the image elements in the block. Each such alpha modifier index is associated with one of the alpha modifiers from the alpha modifier set identified by the alpha modifier provider 330.

The block encoder 300 could optionally comprise an error estimator 350 for estimating error values for the purpose of selection of codewords and image element associated indices for the image block. The choice of codeword and indices that minimizes an associated error value is then selected for the relevant compressed image block version(s).

The units 310 to 350 of the block encoder 300 may be provided as software, hardware or a combination thereof. The units 310 to 350 and 500 may be implemented together in the block encoder 300. Alternatively, a distributed implementation is also possible with some of the units provided elsewhere in the image encoder.

FIG. 14 illustrates a block diagram of another example embodiment of a block encoder 300. This block encoder embodiment is able to operate according to the two previously described compression modes. The operation of the alpha quantizer 320, alpha modifier provider 330 and error estimator 350 has already been described with reference to FIG. 13 and is not repeated herein.

The color quantizer 310 determines a color codeword for the image block to be compressed. When operating according to the first compression mode, this determined color codeword is a single representation of the colors of the image elements in the block. However, when the color quantizer 310 operates according to the second mode, the quantizer 310 generates a color codeword that includes a first color subcodeword and a second color subcodeword. The first and second color subcodewords are then representations of the colors of a first and second portion of the image elements, respectively.

A color modifier provider 360 is implemented in the block encoder 300 and operational in the first compression mode for identifying a color modifier set to use for a current image block. The provider 360 is preferably configured for selecting this modifier set from an associated color table 600. The modifier provider 360 then generates a color modifier codeword that is associated with the selected color modifier set.

In the first mode, the index selector 340 selects, for each image element in the block, color modifiers from color modifier set identified by the color modifier provider 360. The selector 340 then generates respective color modifier indices that are associated with the selected color modifiers. However, when operated according to the second compression mode, the index selector 340 generates, for each image element in a subset of the image elements in the block, a color index associated with one of the color subcodewords determined by the color quantizer 310. A remaining subset of the image elements has a pre-defined association with one of the color codewords and, thus, requires no color index.

This encoder embodiment could be made to always be operated according to the first compression mode or according to the second compression mode. However, in order to provide flexibility to the alpha image processing and increase the image quality of the resulting compressed alpha image, the block encoder 300 can preferably operate according to both modes. In such a case, the encoder 300 preferably includes a compression mode selector 370 that selects a compression mode for each image block to be compressed. This selector 370 could be operated for selecting the compression mode based on input color values of the image elements in the block (i.e. before compressing the block). Alternatively, the mode selection is performed in response to input error representations or input compressed block representations (i.e. after or during compressing the block). These input error representations, which are associated with compressing the image block according to the first mode and the second mode, can be generated by the mode selector 370 itself or received from the error estimator 350.

The mode selector 370 further generates a mode index for the block that represents the selected compression mode and inserts it in the compressed image block representation. In cases where the mode representation is performed by the color modifying codeword, no extra mode index has to be generated by the selector 370. The mode selector 370 preferably also generates and forwards a mode representing signal or command to at least some of the units in the block encoder 300. That mode signal will then cause the respective units to operate according to the first or second compression mode.

The units 310 to 370 of the block encoder 300 may be provided as software, hardware or a combination thereof. The units 310 to 370, 500 and 600 may be implemented together in the block encoder 300. Alternatively, a distributed implementation is also possible with some of the units provided elsewhere in the image encoder.

A preferred example implementation of a color quantizer 310 is illustrated in the block diagram of FIG. 15. The quantizer 310 comprises means 312 configured for determining an average of the colors of the image elements in the image block.

The determined average color is then provided to quantizing means 314, which could directly quantize the average color and generate the color codeword based on this quantized average color. Alternatively, the quantizing means 314 or color averager 312 determines an optimal line passing through the average color point in the color space. Two points on this line are then selected and quantized by the quantizer 314 into two color subcodewords. The point to select can be determined according to the discussion above in connection with FIG. 5.

The units 312 and 314 of the color quantizer 310 may be provided as software, hardware or a combination thereof. The units 312 and 314 may be implemented together in the color quantizer 330. Alternatively, a distributed implementation is also possible with some of the units provided elsewhere in the block encoder.

A preferred implementation of an alpha quantizer 320 according to the technology disclosed herein is illustrated in the block diagram of FIG. 16. The quantizer 320 comprises means 322 configured for determining an average of the alpha of the image elements in the image block. This average alpha value is then provided to quantizing means 324, which quantizes the average alpha value and generates the alpha codeword from this quantized average alpha value.

The units 322 and 324 of the alpha quantizer 320 may be provided as software, hardware or a combination thereof. The units 322 and 324 may be implemented together in the color quantizer 310. Alternatively, a distributed implementation is also possible with some of the units provided elsewhere in the block encoder.

A preferred example implementation of an index selector 340 is illustrated in the block diagram of FIG. 17. This index selector 340 comprises an alpha modifier selector 342 for selecting an alpha modifier for each image element in the block. The alpha modifier indices associated with these selected alpha modifiers are then generated and composed into an alpha index sequence.

The index selector 340 also preferably includes a color modifier selector 344 that is operated in the first compression mode. Correspondingly to the alpha modifier selector 342, this color modifier selector 344 selects a color modifier for each image element in the block. The color modifier indices associated with these selected alpha modifiers are then generated and composed into a color index sequence.

A color selector 346 is preferably implemented in the index selector 340 for selecting, in the second compression mode and for each image element in a portion of the image block, a color index associated with the first or second color subcodeword. The image element(s) in a remaining portion of the block lack(s) color index and instead has (have) a pre-defined subcodeword-association.

The units 342 to 346 of the index selector 340 may be provided as software, hardware or a combination thereof. The units 342 to 346 may be implemented together in the index selector 350. Alternatively, a distributed implementation is also possible with some of the units provided elsewhere in the block encoder.

Decoder

FIG. 18 illustrates a block diagram of an example embodiment of an image decoder 220. The image decoder 220 preferably comprises a block selector 222 for selecting, e.g. from a memory, which encoded image block(s) that should be provided to a block decoder 400 for decoding. The block selector 222 preferably receives input information associated with the encoded image data, e.g. from a header or a rendering engine. An address of a compressed image block having the desired image element(s) is computed based on the input information. This computed address is preferably dependent upon the image-element (pixel, texel or voxel) coordinates within an image. Using the address, the block selector 222 identifies the encoded image block from e.g. a memory or a cache. This identified encoded image block is then fetched from the storage and provided to the block decoder 400.

The (random) access to image elements of an image block advantageously enables selective fetching and decoding of only those portions of an image that are needed. Furthermore, the image can be decoded in any order the data is required. For example, in texture mapping only portions of the texture may be required and these portions will generally be required in a non-sequential order. Thus, the image decoding of the technology disclosed herein can with advantage by applied to process only a portion or section of an image.

The selected encoded image block is forwarded to the block decoder 400. In addition to the image block, the decoder 400 preferably receives information specifying which image elements of the block that should be decoded. The information could specify that the whole image block, i.e. all image elements therein, should be decoded. However, the received information could identify that only a single or a few of the image elements should be decoded. The block decoder 400 then generates a decompressed representation of the image element(s) in the block. This decoded representation is preferably an S-bit color, where S is the number of bits per image element in the original image, e.g. a 24-bit RGB color, and a T-bit alpha value, where T is the number of bits per image element in the original image, e.g. 8-bit alpha value. The block decoder 400 preferably comprises an alpha table 500 that is used during the decoding procedure. Alternatively, this alpha table 500 could be provided elsewhere in the image decoder 220. Usage of different alpha tables for different operational modes and/or image types, discussed above in connection to FIG. 12, also applies to the image decoder 220.

An optional image composer 224 could be provided in the decoder 220. This composer receives the decoded image elements from the block decoder 400 and composes them to generate a pixel, texel or voxel that can be rendered or displayed on a screen. The composer 224 could require several input image elements to generate a single pixel, texel or voxel. This image composer 224 could alternatively be provided in the graphic system.

Although the image decoder 220 of FIG. 18 only includes a single block decoder 400, it can be more advantageous from a processing time point of view to implement multiple block decoders 400 in the image decoder 220. By providing multiple block decoders 400, multiple image blocks from the decomposer 215 may be processed (decoded) in parallel, which reduces the total image decoding time. Alternatively, a first subset of the block decoders could be operated for decompressing an image block according to the first decompression mode and a remaining subset of the block deecoders are operated according to the second decompression mode The units 222, 224 and 400 of the image decoder 220 may be provided as software, hardware or a combination thereof. The units 222, 224, 400 and 500 may be implemented together in the image decoder 220. Alternatively, a distributed implementation is also possible with some of the units provided elsewhere in the user terminal.

FIG. 19 is an illustration of an example embodiment of a block decoder 400. The block decoder 400 comprises a color generator 410 that generates a color representation for the image elements in the image block based on the color codeword. This generator 410 preferably expands the quantized color of the color codeword into a color representation.

An alpha generator 420 is implemented in the block decoder 400 for generating an alpha value or representation for the image elements in the block based on the alpha codeword. This alpha generator 420 preferably expands the quantized alpha value of the alpha codeword into an alpha representation.

The block decoder 400 further includes means 430 for providing an alpha modifier set using the alpha modifying codeword. This alpha modifier set is preferably provided from an associated alpha table 500. This provider 430 could be configured for fetching a first subset of alpha modifier values from the alpha table 500 and determining a second subset of modifiers based on the first subset.

An index or modifier selector 440 is arranged for selecting one of the alpha modifier values from the modifier set obtained by the providing means 430. The modifier selector 440 is configured for selecting correct alpha modifier values for the image elements in the compressed image block based on the sequence of alpha modifying indices.

The expanded alpha value from the alpha generator 420 and the modifier value from modifier selector 440 are forwarded to an alpha modulator or modifier 450 that modifies the expanded alpha value with the modifier value. Furthermore, once the alpha value have been modified the modifier 450 preferably clamps the resulting alpha representation between a maximum and minimum threshold, e.g. between 0 and 255.

The units 410 to 450 of the block decoder 400 may be provided as software, hardware or a combination thereof. The units 410 to 450 and 500 may be implemented together in the block decoder 400. Alternatively, a distributed implementation is also possible with some of the units provided elsewhere in the user terminal.

FIG. 20 illustrates a block diagram of another example embodiment of a block decoder 400. This block decoder embodiment is able to operate according to the two previously described decompression modes. The operation of the alpha generator 420, alpha modifier set provider 430 and alpha modifier 450 has already been described with reference to FIG. 19 and is not repeated herein.

The block decoder 400 comprises a decompression mode selector 480 that selects a mode, according to which a current compressed image block should be decompressed. This mode selection is preferably based on the mode index included in the compressed block representation. Alternatively, the mode selection can be performed by investigating (at least a portion of) the combined color modifying and mode representing codeword. The mode selector 480 generates a mode signal or command representing the mode index and the current decompression mode. This mode signal is forwarded to other units in the block decoder 400, which adjust their respective operation in response to the received mode signal.

A color generator 410 generates, when operating in the first decompression mode, a single color representation for all image elements in the image block based on the color codeword. This generator 410 preferably expands the quantized color of the color codeword into a color representation.

The block decoder 400 further includes means 460 for providing a color modifier set using the color modifying codeword when receiving a "mode 1"-representing mode signal from the mode selector 480. This color modifier set is preferably provided from an associated color table 600. This provider 460 could be configured for fetching a first subset of color modifier values from the color table 600 and determining a second subset of modifiers based on the first subset.

The index selector 440 is arranged for selecting, in the first mode, one of the color modifier values from the color modifier set obtained by the providing means 460. The selector 440 is configured for selecting the correct color modifier values for the image elements in the compressed image block based on the sequence of color modifying indices. However, if the mode command from the mode selector 480 instead signals the second mode, the index selector 440 selects a color subcodeword or representation to use for a subset of the image elements using the color index sequence. As a remaining subset of the image elements have a pre-defined associated color representation (subcodeword) that representation can simply be assigned to this (these) image element(s) without usage of the color index sequence.

The expanded color from the color generator 410 and color modifier value are forwarded, when the decoder is operating according to the first mode, to a color modulator or modifier 470 that modifies (the intensity of) the color components of the expanded color with the color modifier value. The modifier 470 could use a weighted color modifier value, with different weights for the different color components. Furthermore, once the color components have been modified the modifier 470 preferably clamps the components between a maximum and minimum threshold, e.g. between 0 and 255.

The units 410 to 480 of the block decoder 400 may be provided as software, hardware or a combination thereof. The units 410 to 480, 500 and 600 may be implemented together in the block decoder 400. Alternatively, a distributed implementation is also possible with some of the units provided elsewhere in the user terminal.

FIG. 21 schematically illustrates a possible hardware example implementation of a block decoder. The input to the block decoder is an encoded block representation 700 according to FIG. 3B that comprises a 18-bit color codeword 710 (6 bits for each of the red, green and blue component), a 4-bit color modifying codeword 750, a 16-bit color modifier index sequence 760, a 16-bit alpha modifier index sequence 740, a 4-bit alpha modifying codeword 730 and a 6-bit alpha codeword 720. The modifier indices in the two index sequences 740, 760 are organized so that the MSB of the eight color or alpha modifier indices precedes the eight LSB.

The color codeword 710 is provided to the color generator 410, which is realized by three bit extenders 412 to 416. A first bit extender 412 receives the 6-bit red component, a second 414 and third 416 extender receives the 6-bit green and blue component, respectively. The output from respective extender 412 to 416 is an 8-bit color component.

A modifier or index selector 440 is implemented as four multiplexors 442-448. A 3-bit address index is input to these multiplexors 442-448. The first multiplexor 442 outputs, in response to the address index, the MSB of the color modifier index for the addressed image elements. The LSB of the color modifier index is provided by the second multiplexor 444. Correspondingly, the third 446 and fourth 448 multiplexor selects and outputs the MSB and LSB of the alpha modifier index, respectively.

The 2-bit color modifier index associated with the selected image element is then forwarded to a table look-up 465. This table look-up 465 corresponds to the color modifier set provider 460 and color table 600 of FIG. 20. Using the input color modifying codeword 750 and color modifier index the look-up 465 fetches the correct color modifier value from one of the modifier sets in the table. This 9-bit signed (positive or negative) modifier value is then provided to a color modifier 470. In this hardware implementation the color modifier 470 comprises three adders 471 to 473 and three clampers 474 to 476. The modifier value is input to respective adder 471 to 473. A first adder 471 adds the color modifier value to the 8-bit red component from bit extender 412. Correspondingly, adder 472 and adder 473 add the modifier value to the 8-bit green and blue component from bit extender 414 and 416, respectively. In an alternative implementation, the adders 471 to 473 can be replaced with other modifying elements, e.g. multipliers or XOR gates. The outputs from the adders 471 to 473 are forwarded to clampers 474 to 476, which clamp the modified color components between 0 and 255.

The 6-bit alpha codeword 720 is provided to the alpha generator 420, which is realized by a bit extender 425. The output from the extender 425 is an 8-bit alpha value.

The 2-bit alpha modifier index associated with the selected image element is forwarded from the multiplexors 446 and 448 to a table look-up 435. This table look-up 435 corresponds to the alpha modifier set provider 430 and alpha table 700 of FIG. 19 or 20. Using the input alpha modifying codeword 730 and alpha modifier index, the look-up 435 fetches the correct alpha modifier value from one of the modifier sets in the table. This 9-bit signed (positive or negative) modifier value is provided to an alpha modifier 450 together with the extended alpha value from the bit extender 425.

In this hardware implementation the alpha modifier 450 comprises an adder 452 and a clamper 454. The alpha modifier value is input to the adder 452 which adds it to the 8-bit alpha value from the extender 425. It is anticipated by the technology disclosed herein that the adder 452 can be replaced by e.g. multipliers or XOR gates. The output from the adder 452 is forwarded to the clamper 454, which clamps the modified alpha between 0 and 255.

The output from the color clampers 474 to 476 and the alpha clamper 454 is the decompressed or decoded 32-bit RGBA image element.

Although the decoder implementation of FIG. 21 comprises two separate look-up tables 435, 465, one for managing color and one for alpha, a single table look-up could be employed for decoding both these image element properties.

FIG. 22 schematically illustrates a possible hardware implementation of the bit extenders 412, 414, 416 and 425 of FIG. 21. These extenders receive a 6-bit color component or alpha codeword and output an extended corresponding 8-bit color component or alpha value. In the output, the six MSBs constitute the input 6-bit word, the "seventh MSB" corresponds to the MSB of the input and the LSB correspond to the "second MSB" of the input word.

FIG. 23 schematically illustrates a possible hardware implementation of the clampers 454; 474-476 of FIG. 21. The input to the clamper 454; 474-476 is a 10-bit modified color component value or alpha value. The eight LSBs of this input value are brought a multiplexor 456. The other input to the multiplexor 456 is the maximum threshold value (255; 8 bits). The multiplexor 445 selects either the 8-bit input value or the maximum threshold value based on the second MSB of the input word. In other words, if this second MSB is equal to one, the multiplexor 456 outputs the threshold value, otherwise the 8-bit input value is forwarded to a second multiplexor 458. This second multiplexor 448 selects either the output from the first multiplexor 456 or a minimum threshold value (0; 8 bits) based on the MSB of the color component. If this MSB or sign bit is equal to one, the output from the first multiplexor 456 is negative and the minimum threshold value should be selected by the second multiplexor 458. However, if the sign bit is zero the output from the first multiplexor 456 should also be output from the second multiplexor 458.

FIG. 24 schematically illustrates a possible hardware implementation of the table look-ups 435; 465 of FIG. 21. The three LSBs of the 4-bit input modifying codeword are input to two multiplexors 431 and 432 for selecting one 7-bit alpha or color modifier value from eight possible modifier values for each multiplexor 431 and 432. From these 16 intensity modifiers the remaining 48 values could be calculated if employing an alpha/color table according to Table 1. The selected modifier values from the multiplexors 431 and 432 are input to another multiplexor 433 that selects one of these values based on 1-bit input data (1 bit of the 2-bit alpha or color modifier index) from the multiplexors 442, 444 or 446, 448 in FIG. 21. The selected modifier value is then forwarded both to a multiplexor 436 and to negation means 434 that negates the modifier value. Also this negated value is forwarded to the multiplexor 436. This multiplexor 436 selects either the positive 7-bit modifier value or the negated value based on the remaining bit of the modifier index from multiplexors 442, 444 or 446, 448 in FIG. 21. The selected (8-bit) modifier value is brought both to a multiplexor 438 and to a bit-shifter 437 that shifts the modifier value one bit to the left, resulting in a 9-bit modifier value (corresponds to a multiplication of the value, in base ten, by two). The multiplexor 438 selects either the 8-bit modifier value or the 9-bit modifier value based on the MSB from the input modifying codeword. The result from the selection is the 9-bit modifier value, out of the 64 possible modifier values, to use for a specific image element.

The hardware solution for the block encoder in FIG. 21 is very simple, it basically comprises only four adders, one negation means, and 22 multiplexors if the table lock-ups 435; 465 and clampers 454; 474-476 are implemented according to FIG. 23 and FIG. 24, respectively.

It will be understood by a person skilled in the art that various modifications and changes may be made to the present invention without departure from the scope thereof, which is defined by the appended claims.

REFERENCES

[1] U.S. Pat. No. 5,956,431
[2] Y. Linde, A. Buzo and R. Gray, "An algorithm for vector quantizer design", *IEEE Transactions on Communications*, Vol. 28, pp. 84-94, January, 1980

The invention claimed is:

1. A method of compressing an image block comprising multiple image elements, said method comprising the steps of:
    a computer-implemented color quantizer determining a color codeword that is a representation of the colors of said multiple image elements;
    a computer-implemented alpha quantizer determining an alpha codeword that is a representation of the alpha values of said multiple image elements;
    providing an alpha modifying codeword that is a representation of a set of multiple alpha modifiers for modifying an alpha value generated based on said alpha codeword; and
    a computer-implemented index selector selecting, for each image element in said image block, an alpha modifier index associated with an alpha modifier from said alpha modifier set.

2. The method according to claim 1, further comprising the steps of:
    providing a color modifying codeword that is a representation of a set of multiple color modifiers for modifying a color generated based on said color codeword; and
    selecting, for each image element in said image block, a color modifier index associated with a color modifier from said color modifier set.

3. The method according to claim 2, wherein providing the color modifying codeword comprises selecting said color modifier set from a color table comprising multiple color modifier sets, whereby said color modifying codeword enables identification of said selected color modifier set from said color table.

4. The method according to claim 1, wherein determining the color codeword comprises:
    determining a first color subcodeword that is a representation of the colors of at least a first portion of said multiple image elements; and determining a second color subcodeword that is a representation of the colors of at least a second portion of said multiple image elements, said method further comprising:
　　selecting, for each image element in at least a subset of said multiple image elements, a color index associated with said first color subcodeword or said second color subcodeword.

5. The method according to claim 4, wherein a sequence of said color indices comprises, for each image element in a first subset of said multiple image elements, a color index associated with said first or second color subcodeword, each image element in a second remaining subset of said multiple image elements is associated with a pre-defined color subcodeword selected from said first or second color subcodeword.

6. The method according to claim 1, wherein providing the alpha modifying codeword comprises said selecting said alpha modifier set from an alpha table comprising multiple alpha modifier sets, whereby said alpha modifying codeword enables identification of said selected alpha modifier set from said alpha table.

7. A method of processing a compressed representation of an image block comprising multiple image elements, said compressed representation comprising a color codeword, an alpha codeword, an alpha modifying codeword and an alpha modifier index sequence, and said method comprising:
　　providing a set of multiple alpha modifiers based on said alpha modifying codeword; for at least one image element in said image block:
　　　　a computer-implemented color generator generating a color representation based on said color codeword;
　　　　a computer-implemented alpha generator generating an alpha representation based on said alpha codeword;
　　　　a computer-implemented selector selecting an alpha modifier from said alpha modifier set based on said alpha modifier index sequence; and
　　　　a computer-implemented alpha modifier modifying said alpha representation based on said selected alpha modifier.

8. The method according to claim 7, wherein said compressed image block representation further comprises a color modifying codeword and a color modifier index sequence, said method further comprising:
　　providing a set of multiple color modifiers based on said color modifying codeword;
　　selecting a color modifier from said color modifier set based on said color modifier index sequence; and
　　modifying said color representation based on said selected color modifier.

9. The method according to claim 8, wherein providing said color modifier set comprises selecting, based on said color modifying codeword, said color modifier set from a color table comprising multiple color modifier sets.

10. The method according to claim 6, wherein said color codeword comprises a first color subcodeword and a second color subcodeword and said compressed image block representation further comprises a color index sequence, and generating the color representation comprises:
　　generating said color representation based on at least one color subcodeword selected from said first and second color subcodeword.

11. The method according to claim 10, wherein said color index sequence comprises, for each image element in a first subset of said multiple image elements, a color index associated with said first or second color subcodeword, each image element in a second remaining subset of said multiple image elements is associated with a pre-defined color subcodeword selected from said first or second color subcodeword.

12. The method according to claim 7, wherein providing the alpha modified set comprises selecting, based on said alpha modifying codeword, said alpha modifier set from an alpha table comprising multiple alpha modifier sets.

13. A computer program product stored on a computer-readable medium and defining a block encoder for compressing an image block comprising multiple image elements, said computer program product comprising coded instructions which, when executed by a computer, perform functions comprising:
　　a color quantizer configured to determine a color codeword that is a representation of the colors of said multiple image elements;
　　an alpha quantizer configured to determine an alpha codeword that is a representation of the alpha values of said multiple image elements;
　　an alpha modifying codeword provider configured to provide an alpha modifying codeword that is a representation of a set of multiple alpha modifiers for modifying an alpha value generated based on said alpha codeword; and
　　an index selector configured to select, for each image element in said image block, an alpha modifier index associated with an alpha modifier from said alpha modifier set.

14. The computer program product according to claim 13, wherein said coded instructions, when executed by a computer, provide a color modifying codeword that is a representation of a set of multiple color modifiers for modifying a color generated based on said color codeword, wherein said index selector is configured to select, for each image element in said image block, a color modifier index associated with a color modifier from said color modifier set.

15. The computer program product according to claim 14, wherein acts performed by execution of the coded instructions comprise selecting said color modifier set from a color table comprising multiple color modifier sets, whereby said color modifying codeword enables identification of said selected color modifier set from said color table.

16. The computer program product according to claim 13, wherein the acts performed by execution of the coded instructions further comprise determining a first color subcodeword that is a representation of the colors of at least a first portion of said multiple image elements and a second color subcodeword that is a representation of the colors of at least a second portion of said multiple image elements, and said index selector is configured for selecting, for each image element in at least a subset of said multiple image elements, a color index associated with said first color subcodeword or said second color subcodeword.

17. The computer program product according to claim 16, wherein a sequence of said color indices comprises, for each image element in a first subset of said multiple image elements, a color index associated with said first or second color subcodeword, each image element in a second remaining subset of said multiple image elements being associated with a pre-defined color subcodeword selected from said first or second color subcodeword.

18. The computer program product according to claim 13, wherein the alpha modifying codeword provider is configured to select said alpha modifier set from an alpha table comprising multiple alpha modifier sets,
　　whereby said alpha modifying codeword enables identification of said selected alpha modifier set from said alpha table.

19. A computer comprising a block encoder for compressing an image block comprising multiple image elements, said block encoder comprising:
  a color quantizer configured to determine a color codeword that is a representation of the colors of said multiple image elements;
  an alpha quantizer configured to determine an alpha codeword that is a representation of the alpha values of said multiple image elements;
  means for providing an alpha modifying codeword that is a representation of a set of multiple alpha modifiers for modifying an alpha value generated based on said alpha codeword; and
  an index selector configured to select, for each image element in said image block, an alpha modifier index associated with an alpha modifier from said alpha modifier set.

20. A computer program product stored on a computer-readable medium and defining a block decoder for processing a compressed representation of an image block comprising multiple image elements, said compressed representation comprises a color codeword, an alpha codeword, an alpha modifying codeword and an alpha modifier index sequence, said computer program product comprising coded instructions which, when executed by a computer, perform acts comprising:
  providing a set of multiple alpha modifiers based on said alpha modifying codeword;
  generating a color representation for at least one image element in said image block based on said color codeword;
  generating an alpha value for said at least one image element based on said alpha codeword;
  selecting, for said at least one image element, an alpha modifier from said identified alpha modifier set based on said alpha modifier index sequence; and
  modifying said alpha value based on said selected alpha modifier.

21. A computer comprising a block decoder for processing a compressed representation of an image block comprising multiple image elements, said compressed representation comprises a color codeword, an alpha codeword, an alpha modifying codeword and an alpha modifier index sequence, said block decoder comprising computer program elements comprising:
  means for providing a set of multiple alpha modifiers based on said alpha modifying codeword;
  a color generator for generating a color representation for at least one image element in said image block based on said color codeword;
  an alpha generator for generating an alpha value for said at least one image element based on said alpha codeword;
  a selector for selecting, for said at least one image element, an alpha modifier from said identified alpha modifier set based on said alpha modifier index sequence; and
  an alpha modifier for modifying said alpha value based on said selected alpha modifier.

22. A mobile user terminal comprising:
  a memory configured to store a compressed representation of an image block comprising a color codeword, an alpha codeword, an alpha modifying codeword and an alpha modifier index sequence; and
  a block decoder configured to process said compressed representation of said image block, said block decoder comprising:
    means for providing a set of multiple alpha modifiers based on said alpha modifying codeword;
    a color generator configured to generate a color representation for at least one image element in said image block based on said color codeword;
    an alpha generator configured to generate an alpha value for said at least one image element based on said alpha codeword;
    a selector configured to select, for said at least one image element, an alpha modifier from said identified alpha modifier set based on said alpha modifier index sequence; and
    an alpha modifier configured to modify said alpha value based on said selected alpha modifier.

23. The mobile user terminal according to claim 22, wherein said compressed image block representation further comprises a color modifying codeword and a color modifier index sequence, said block decoder further comprises:
  means configured to provide a set of multiple color modifiers based on said color modifying codeword; and
  a color modifier configured to modify said color representation based on a color modifier selected by said selector from said color modifier set using said color modifier index sequence.

24. The mobile user terminal according to claim 23, wherein said color modifier set providing means is configured to select, based on said color modifying codeword, said color modifier set from a color table comprising multiple color modifier sets.

25. The mobile user terminal according to claim 22, wherein said color codeword comprises a first color subcodeword and a second color subcodeword and said compressed image block representation further comprises a color index sequence, and said color generator is configured for generating said color representation based on at least one color subcodeword selected by said selector from said first and second color subcodeword.

26. The mobile user terminal according to claim 25, wherein said color index sequence comprises, for each image element in a first subset of said multiple image elements, a color index associated with said first or second color subcodeword, each image element in a second remaining subset of said multiple image elements is associated with a pre-defined color subcodeword selected from said first or second color subcodeword.

27. The mobile user terminal according to claim 22, wherein said alpha modifier set providing means is configured to select, based on said alpha modifying codeword, said alpha modifier set from an alpha table comprising multiple alpha modifier sets.

* * * * *

UNITED STATES PATENT AND TRADEMARK OFFICE
CERTIFICATE OF CORRECTION

| | |
|---|---|
| PATENT NO. | : 7,657,105 B2 |
| APPLICATION NO. | : 10/582689 |
| DATED | : February 2, 2010 |
| INVENTOR(S) | : Jacob Ström |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 546 days.

should read (*) Notice: Subject to any disclaimer, the term of this patent is extended or adjusted under 35 U.S.C. 154(b) by 780 days.

In Column 30, Line 29, insert -- Thus, an index sequence of 10110001 1000011$_{bin}$ represents the following modifier indices 11$_{bin}$, 00$_{bin}$, 10$_{bin}$, 10$_{bin}$, 00$_{bin}$, 01$_{bin}$, 01$_{bin}$ and 10$_{bin}$. --, after "LSB." as a continuation of the paragraph.

Signed and Sealed this

Twenty-second Day of June, 2010

David J. Kappos
*Director of the United States Patent and Trademark Office*